US011418774B2

(12) United States Patent
Ha et al.

(10) Patent No.: US 11,418,774 B2
(45) Date of Patent: Aug. 16, 2022

(54) DISPLAY DEVICE AND PANEL BONDING SYSTEM INCLUDING THE SAME

(71) Applicant: SAMSUNG DISPLAY CO., LTD., Yongin-si (KR)

(72) Inventors: Young Sang Ha, Suwon-si (KR); Jeong Woo Park, Yongin-si (KR)

(73) Assignee: SAMSUNG DISPLAY CO., LTD., Yongin-si (KR)

(*) Notice: Subject to any disclaimer, the term of this patent is extended or adjusted under 35 U.S.C. 154(b) by 0 days.

(21) Appl. No.: 17/352,970

(22) Filed: Jun. 21, 2021

(65) Prior Publication Data

US 2021/0400254 A1 Dec. 23, 2021

(30) Foreign Application Priority Data

Jun. 22, 2020 (KR) .................. 10-2020-0075632

(51) Int. Cl.
*B32B 41/00* (2006.01)
*H04N 13/305* (2018.01)
*B32B 38/18* (2006.01)
*B32B 37/12* (2006.01)

(52) U.S. Cl.
CPC .......... *H04N 13/305* (2018.05); *B32B 37/12* (2013.01); *B32B 38/1833* (2013.01); *B32B 41/00* (2013.01); *B32B 2037/1253* (2013.01); *B32B 2041/04* (2013.01); *B32B 2307/418* (2013.01); *B32B 2457/20* (2013.01)

(58) Field of Classification Search
CPC .. H04N 13/305; B32B 37/12; B32B 38/1833; B32B 41/00; B32B 2037/1253; B32B 2041/04; B32B 2307/418; B32B 2457/20

USPC .................. 156/60, 64, 350, 351, 378, 379
See application file for complete search history.

(56) References Cited

U.S. PATENT DOCUMENTS

| 6,151,062 A     | * | 11/2000 | Inoguchi ............. H04N 13/327 348/51 |
| 2013/0176525 A1 | * | 7/2013  | Liao ........................ G02B 30/27 349/191 |
| 2015/0162362 A1 | * | 6/2015  | Wong .................... H04N 13/327 29/592.1 |
| 2021/0286194 A1 | * | 9/2021  | Park ....................... B32B 37/18 |

FOREIGN PATENT DOCUMENTS

KR    10-2015-0074452    7/2015

* cited by examiner

*Primary Examiner* — Michael N Orlando
*Assistant Examiner* — Joshel Rivera
(74) *Attorney, Agent, or Firm* — F. Chau & Associates, LLC

(57) ABSTRACT

Provided is a display device. The display device comprises: a display module including a display panel, wherein the display panel includes a display area having a plurality of pixels and an alignment mark area surrounded by the display area, and a display driver driving at least one of the plurality of pixels in the alignment mark area to form an alignment mark; and a stereoscopic lens including a base disposed on the display module, a plurality of lenses disposed on the base at an angle offset from a side of the display module, and a marking portion formed on one or more of the plurality of lenses to overlap the alignment mark area.

19 Claims, 21 Drawing Sheets

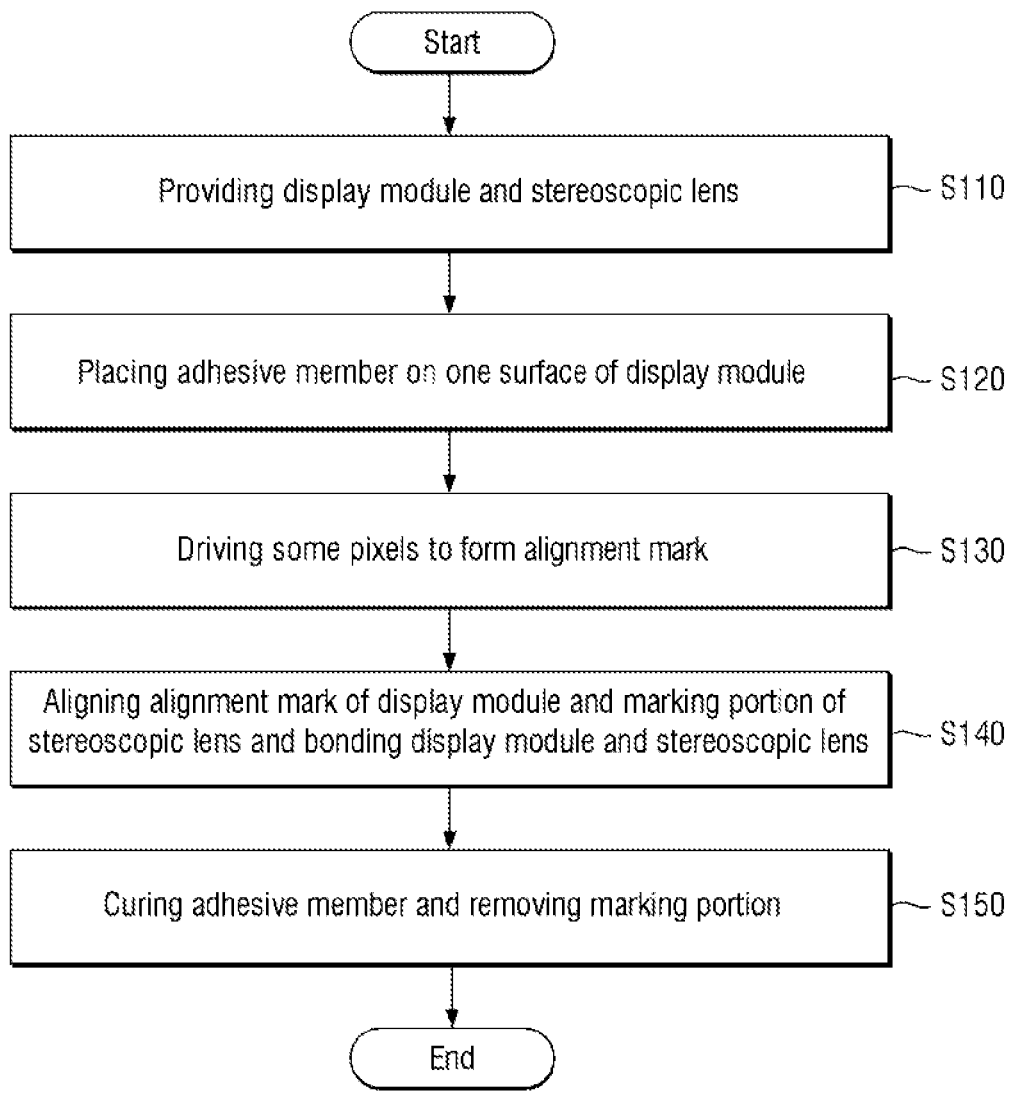

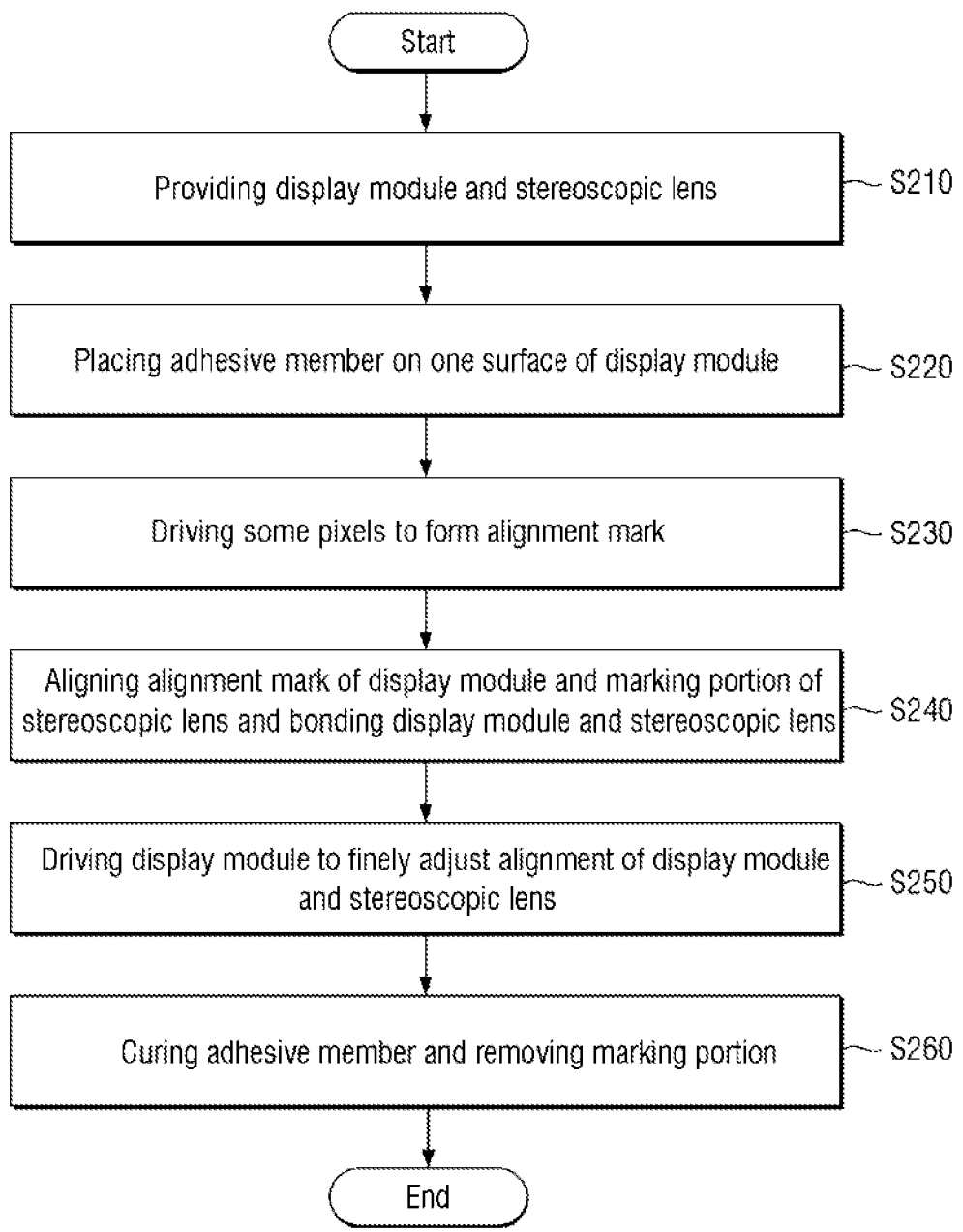

DISPLAY DEVICE AND PANEL BONDING SYSTEM INCLUDING THE SAME

CROSS-REFERENCE TO RELATED APPLICATION

This application claims priority from Korean Patent Application No. 10-2020-0075632 filed on Jun. 22, 2020, in the Korean Intellectual Property Office, the disclosure of which is incorporated by reference herein in its entirety.

TECHNICAL FIELD

The present disclosure relates to a display device and a panel bonding system including the same. More particularly, embodiments of the present disclosure relate to a system for affixing a stereoscopic lens to a display module.

DISCUSSION OF THE RELATED ART

Stereoscopic image display devices are classified into binocular parallax type stereoscopic image display devices and complex parallax perception type stereoscopic image display devices. Binocular parallax type stereoscopic image display devices may use parallax images of left and right eyes and may be classified into glass-type stereoscopic image display devices and glass-free stereoscopic image display devices. A glass-type stereoscopic image display device changes the polarization of left and right parallax images on a direct-view display device or a projector and displays the images, and implements a stereoscopic image using a polarizing glass, or displays left and right parallax images in a time-division manner and implements a stereoscopic image using a shutter glass. A glass-free stereoscopic image display device separates the optical axes of left and right parallax images using an optical plate such as a parallax barrier or a lenticular sheet and produces a stereoscopic image. The manufacture of stereoscopic image display devices may include processes to affix a stereoscopic lens to a display panel. If the lens is misaligned, the stereoscopic image produced by the device may be degraded, or the device may lose reliability. Additionally, manufacturing processes may take longer if post-application alignment procedures are used. A system for aligning the stereoscopic lens to the display panel as related to the present disclosure may alleviate issues related to the manufacturing process.

Such a stereoscopic image display device may be manufactured using a bonding apparatus for bonding a display panel and a stereoscopic lens.

SUMMARY

According to embodiments of the present disclosure, a display device includes: a display module including a display panel, wherein the display panel includes a display area having a plurality of pixels and an alignment mark area surrounded by the display area, and a display driver driving at least one of the plurality of pixels in the alignment mark area to form an alignment mark; and a stereoscopic lens including a base disposed on the display module, a plurality of lenses disposed on the base at an angle offset from a side of the display module, and a marking portion formed on some of the plurality of lenses to overlap the alignment mark area.

In an embodiment of the present disclosure, the marking portion of the display device includes a marking line disposed in a direction perpendicular to an extending direction of the plurality of lenses, and the marking line includes a material softened by light of a specific wavelength.

In an embodiment of the present disclosure, the marking portion is defined as an area between a plurality of marking lines provided on at least one of the plurality of lenses.

In an embodiment of the present disclosure, one side of the marking portion is parallel or perpendicular to an extending direction of the plurality of lenses.

In an embodiment of the present disclosure, the alignment mark area is disposed at a center of the display panel, and the marking portion is disposed at a center of the stereoscopic lens.

In an embodiment of the present disclosure, the display panel includes a plurality of alignment mark areas spaced apart from each other with respect to a center point of the display panel, and the stereoscopic lens includes a plurality of marking portions spaced apart from each other with respect to a center point of the stereoscopic lens.

In an embodiment of the present disclosure, the display panel includes a plurality of alignment mark areas adjacent to a plurality of corners of the display panel, respectively, and the stereoscopic lens includes a plurality of marking portions adjacent to a plurality of corners of the stereoscopic lens.

In an embodiment of the present disclosure, a panel bonding system includes: a display module including a display panel having a plurality of pixels and a display driver driving some of the plurality of pixels to form an alignment mark; a stereoscopic lens including a base disposed on the display module, a plurality of lenses disposed on the base at an angle offset from a side of the display module, and a marking portion formed on some of the plurality of lenses to overlap the alignment mark; and a panel bonding apparatus aligning the alignment mark and the marking portion and bonding the display module and the stereoscopic lens.

In an embodiment of the present disclosure, the marking portion includes a marking line disposed in a direction perpendicular to an extending direction of the plurality of lenses, and the marking line includes a material softened by light of a specific wavelength.

In an embodiment of the present disclosure, the marking portion is defined as an area between a plurality of marking lines provided on at least one of the plurality of lenses.

In an embodiment of the present disclosure, one side of the marking portion is parallel or perpendicular to an extending direction of the plurality of lenses.

In an embodiment of the present disclosure, the display panel includes: a display area including the plurality of pixels, and an alignment mark area surrounded by the display area and including a set of pixels forming the alignment mark. A set of pixels may be any one or more pixels.

In an embodiment of the present disclosure, the alignment mark is formed by driving pixels arranged in a predetermined row and pixels arranged in a predetermined column intersecting the predetermined row among the set of pixels in the alignment mark area.

In an embodiment of the present disclosure, the plurality of pixels includes a plurality of unit pixels each including first to third sub-pixels, and the alignment mark is formed by lighting unit pixels arranged in a predetermined row and unit pixels arranged in a predetermined column intersecting the predetermined row among the set of pixels in the alignment mark area.

In an embodiment of the present disclosure, the plurality of pixels includes a plurality of first to third sub-pixels, and the alignment mark is formed by lighting first sub-pixels arranged in a predetermined row and first sub-pixels arranged in a predetermined column intersecting the predetermined row among the set of pixels in the alignment mark area.

In an embodiment of the present disclosure, the panel bonding apparatus comprises: a camera unit configured to photograph alignment of the alignment mark and the marking portion to generate image data; an alignment calculation unit calculating a horizontal distance and vertical distance for alignment adjustment based on the image data to generate alignment data; and a bonding unit bonding the display module and the stereoscopic lens based on the alignment data.

In an embodiment of the present disclosure, the bonding unit comprises: an adhesive member supply module providing an adhesive member between the display module and the stereoscopic lens; a bonding module configured to attach the display module and the stereoscopic lens with the adhesive member and adjusting the alignment of the display module and the stereoscopic lens based on the alignment data; and a curing module configured to irradiate the adhesive member.

In an embodiment of the present disclosure, the curing module softens the marking line by irradiating the marking line with light.

In an embodiment of the present disclosure, the bonding unit further comprises: an adjustment module configured to drive the display module after the alignment of the display module and the stereoscopic lens is adjusted by the bonding module, and to finely adjust the alignment of the display module and the stereoscopic lens.

In the embodiment of the present disclosure, the adjustment module performs the fine adjustment based on degree of clearness of light emitted from the display module, wherein the light is passed through the stereoscopic lens and reaches a specific field of view.

BRIEF DESCRIPTION OF THE DRAWINGS

The above and other aspects and features of the present invention will become more apparent by describing in detail embodiments thereof with reference to the attached drawings, in which:

FIG. 20 is a flowchart illustrating a panel bonding process according to an embodiment; and FIG. 21 is a flowchart illustrating a panel bonding process according to another embodiment.

DETAILED DESCRIPTION OF THE EMBODIMENTS

Figure 1:
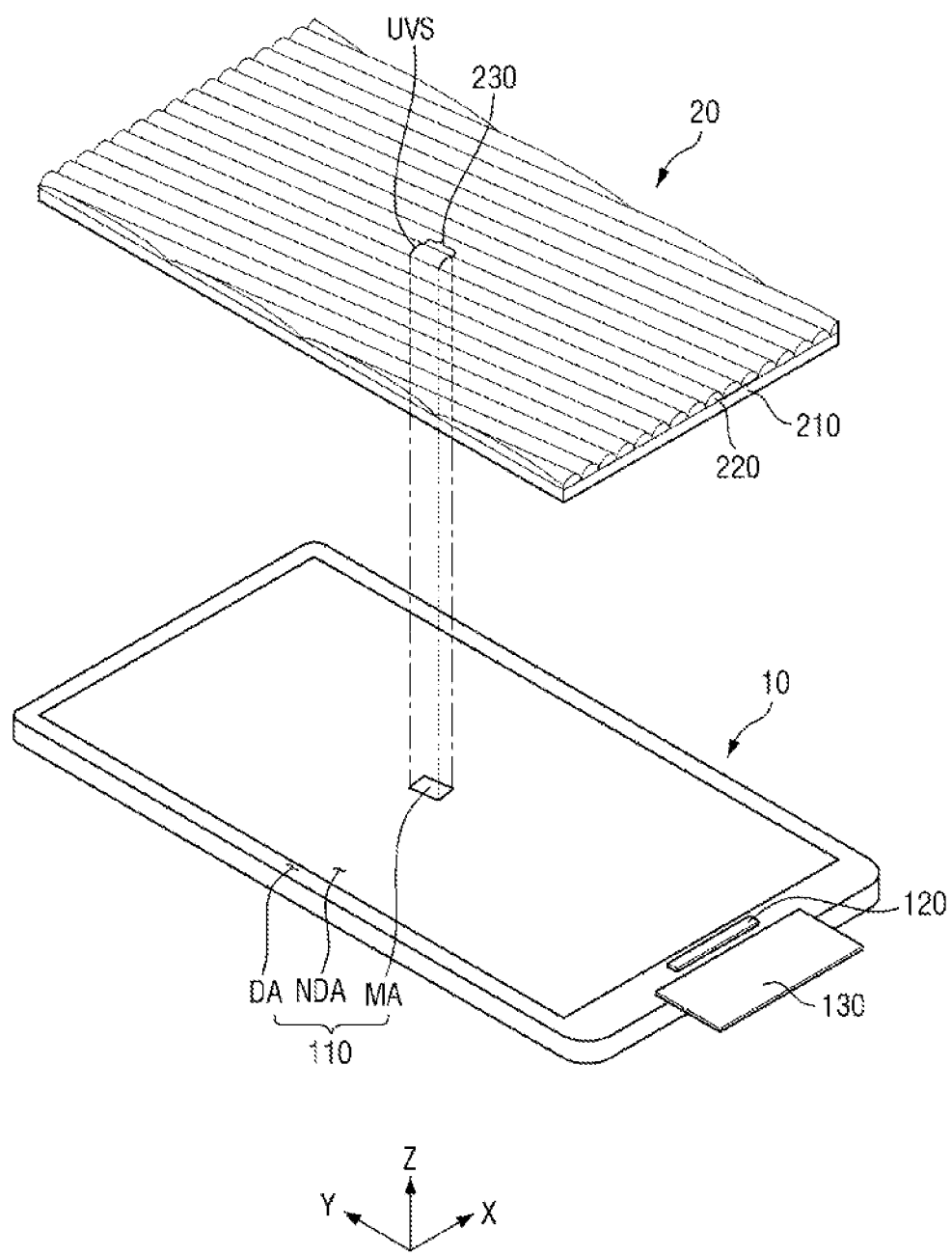
FIG. 1 is an exploded perspective view of a display device according to an embodiment.

In the following description, for the purposes of explanation, numerous specific details are set forth to provide a thorough understanding of various embodiments or implementations of the invention. As used herein "embodiments" and "implementations" are interchangeable words that are non-limiting examples of devices or methods employing one or more of the inventive concepts disclosed herein. It is apparent, however, that various embodiments may be practiced without these specific details or with one or more equivalent arrangements. In other instances, well-known structures and devices are shown in block diagram form in order to avoid unnecessarily obscuring various embodiments. Further, various embodiments may be different, but do not have to be exclusive. For example, specific shapes, configurations, and characteristics of an embodiment may be used or implemented in another embodiment without departing from the inventive concepts.

Unless otherwise specified, the illustrated embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, the element may be directly on, connected to, or coupled to the other element or layer or intervening elements or layers may be present. When, however, an element or layer is referred to as being "directly on," "directly connected to," or "directly coupled to" another element or layer, there are no intervening elements or layers present. Accordingly, the term "connected" may refer to physical, electrical, and/or fluid connection, with or without intervening elements. Further, the X-axis, the Y-axis, and the Z-axis are not limited to three axes of a rectangular coordinate system, such as the x, y, and z axes, and may be interpreted in a broader sense. For example, the X-axis, the Y-axis, and the Z-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any combination of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one element's relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional and/or exploded illustrations that are schematic illustrations of idealized embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, these blocks, units, and/or other modules may be programmed and controlled using software (e.g., microcode) to perform various functions discussed herein and may optionally be driven by firmware and/or software. It is also noted that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some embodiments may be physically separated into two or more interacting and discrete blocks, units, and/or modules without departing from the scope of the inventive concepts. Further, the blocks, units, and/or modules of some embodiments may be physically combined into more complex blocks, units, and/or modules without departing from the scope of the inventive concepts.

Unless otherwise defined, the terms (including technical and scientific terms) used herein have the same meaning as commonly understood by one of ordinary skill in the art. Terms, such as those defined in commonly used dictionaries, should be interpreted as having a meaning that is consistent with their meaning in the context of the relevant art and should not be interpreted in an idealized or overly formal sense, unless expressly so defined herein.

Figure 2:
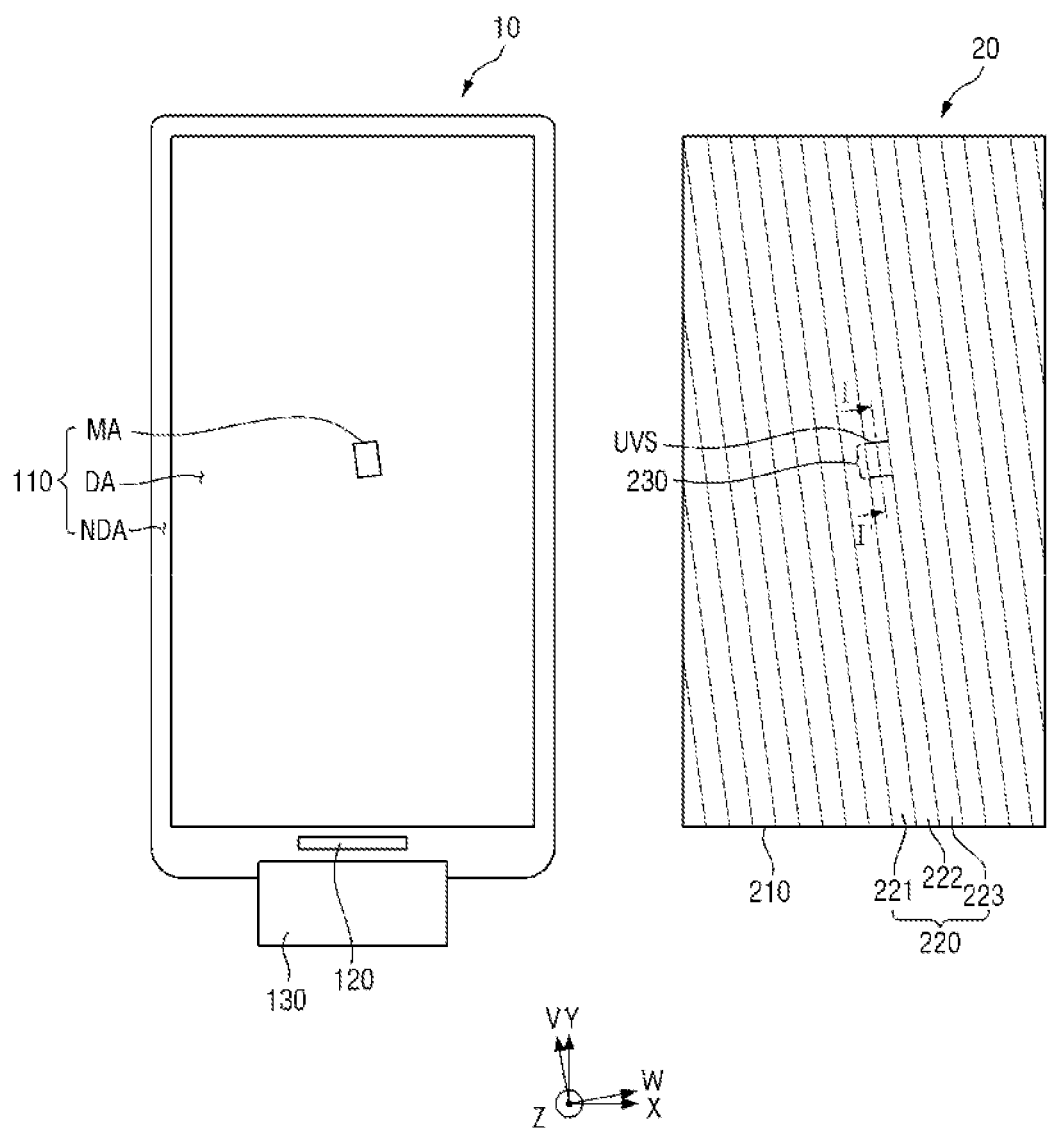
FIG. 2 is a plan view illustrating a display module and a stereoscopic lens of the display device according to an embodiment.

FIG. 1 is an exploded perspective view of a display device according to an embodiment, and FIG. 2 is a plan view illustrating a display module and a stereoscopic lens of the display device according to an embodiment.

Referring to FIGS. 1 and 2, the display device may include a display module 10 and a stereoscopic lens 20.

The display device, which is a device for displaying a moving image or a still image, may be used as a display screen for various products such as televisions, notebooks, monitors, billboards, internet of things (IOTs) as well as portable electronic appliances such as mobile phones, smart phones, tablet personal computers (tablet PCs), smart watches, watch phones, mobile communication terminals, electronic notebooks, electronic books, portable multimedia players (PMPs), navigators, and ultra mobile PCs (UMPCs).

The display module 10 may include a display panel 110, a display driver 120, and a circuit board 130.

The display panel 110 may include a light emitting display panel including a light emitting element. For example, the display panel 110 may be an organic light emitting display panel using an organic light emitting diode in an organic light emitting layer, a micro LED display panel using a micro LED, a quantum dot light emitting display panel using a quantum dot light emitting diode including a quantum dot light emitting layer, or an inorganic light emitting display panel using an inorganic light emitting element including an inorganic semiconductor.

The display panel 110 may include a display area DA, an alignment mark area MA, and a non-display area NDA. The display area DA may include data lines, scan lines, voltage supply lines, and a plurality of pixels. For example, the scan lines may extend in the first direction (X-axis direction) and may be spaced apart from each other in the second direction (Y-axis direction). The data lines and the voltage supply lines may extend in the second direction (Y-axis direction) and may be spaced from each other in the first direction (X-axis direction).

Each of the pixels may be connected to at least one scan line, at least one data line, and at least one power supply line. Each of the pixels may include thin film transistors, including a driving transistor and at least one switching transistor, a light emitting element, and a capacitor. Each of the pixels may receive a data voltage of the data line DL when a scan signal is applied from the scan line, and may emit light by supplying a driving current to the light emitting element determined by the data voltage applied to a gate electrode.

The alignment mark area MA may be disposed in the display area DA. The alignment mark area MA may include a set of pixels among a plurality of pixels in the display area DA capable of displaying an image. A set of pixels may be any one or more pixels in the display device. In some examples, the alignment mark area MA may be disposed at the center of the display area DA, but the present invention is not limited thereto. The pixels in the alignment mark area MA may be driven during the process of bonding the display module 10 and the stereoscopic lens 20 to form an alignment mark. For example, the display device may form an alignment mark using a set of pixels in the display area DA without using an alignment mark that is disposed outside the display area DA or not related to the display image. The display device may change and control the alignment mark by adjusting the driving of the display driver. The display device may form an alignment mark using a set of pixels in the alignment mark area MA, thereby reducing the size of the alignment mark. Accordingly, a panel bonding system may improve alignment precision and reduce alignment time by aligning the alignment mark formed using the set of pixels in the display module 10 with a marking portion 230 of the stereoscopic lens 20.

For example, the panel bonding system may reduce panel bonding time and cost by omitting a separate additional adjustment process after the bonding process through alignment. As another example, the panel bonding system may maximize the alignment precision of the display module 10 and the stereoscopic lens 20 by performing an alignment process with improved precision and a separate adjustment process.

The non-display area NDA may surround the display area DA at the edge of the display panel 110. The non-display area NDA may include a scan driver (not shown) applying scan signals to the scan lines, and pads (not shown) connected to the circuit board 130. For example, the display driver 120 may be disposed on one side of the non-display area NDA, and the pads may be disposed on one edge of the non-display area NDA on which the display driver 120 is disposed.

The display driver 120 may output signals and voltages for driving the display panel 110. The display driver 120 may supply data voltages to the data lines. The display driver 120 may supply a power voltage to the power supply line, and may supply scan control signals to the scan driver. For example, the display driver 120 is formed as an integrated circuit (IC), and may be disposed in the non-display area NDA of the display panel 110 by a chip on glass (COG) method, a chip on plastic (COP) method, or an ultrasonic bonding method. In another example, the display driver 120 may be mounted on the circuit board 130 and connected to the pads of the display panel 110.

The circuit board 130 may be attached onto the pads of the display panel 110 using an anisotropic conductive film (ACF). The lead lines of the circuit board 130 may be electrically connected to the pads of the display panel 110. The circuit board 300 may be a flexible printed circuit board (FPCB), a printed circuit board (PCB), or a flexible film such as a chip on film (COF).

The stereoscopic lens 20 may be disposed on the display module 10. The stereoscopic lens 20 may be attached to one surface of the display module 10 through an adhesive member. The stereoscopic lens 20 may be bonded to the display module 10 by a panel bonding apparatus. For example, the stereoscopic lens 20 may be implemented as a lenticular lens sheet including a plurality of lenses 220. As another example, the stereoscopic lens 20 may be implemented as a liquid crystal lens that forms lenses by controlling liquid crystals in a liquid crystal layer. When the stereoscopic lens 20 is implemented as a lenticular lens sheet, the stereoscopic lens 20 may include a base 210, a plurality of lenses 220, and a marking portion 230.

The base 210 may be directly disposed on the upper surface of the display module 10. For example, one surface of the base 210 facing the display module 10 and the other surface of the base 210 opposite to one surface of the base 210 may be parallel to each other. The base 210 may output light incident from the display module 10 substantially unaltered. The direction of light passing through one surface of the base 210 may coincide with the direction of light passing through the other surface of the base 210. The base 210 may be integrally formed with the plurality of lenses 220, but the present invention is not limited thereto.

The plurality of lenses 220 may be disposed on the base 210 to change the direction of light incident from the display module 10. The light incident from the display module 10 may pass through the base 210 to reach the plurality of lenses 220. The plurality of lenses 220 may be inclined from one side of the display module 10. One side of the display module 10 may extend in the Y-axis direction, and the plurality of lenses 220 may extend in the V-axis direction inclined by a predetermined angle from the Y-axis direction. For example, the plurality of lenses 220 may be slanted lenses inclined by a predetermined angle with respect to one side of the display panel 110. Here, the predetermined angle may be designed to prevent a color band of the display device from being viewed by a viewer. The plurality of lenses may include first to third lenses 221, 222, and 223.

The plurality of lenses 220 may be integrally formed with the base 210. For example, the plurality of lenses 220 may be formed on the upper surface of the base 210 by embossing. The plurality of lenses 220 may be half-cylindrical lenses, but are not limited thereto. As another example, the plurality of lenses 220 may be implemented as Fresnel lenses. As another example, the plurality of lenses 220 may be manufactured separately from the base 210 and then attached to the base 210.

The marking portion 230 may be formed on some lenses of the plurality of lenses 220 to overlap the alignment mark area MA. The marking portion 230 may include a marking line UVS disposed in a direction perpendicular to the extending direction of the plurality of lenses 220. The marking portion 230 may be formed by applying a plurality of marking lines UVS on the second lens 222. The marking line UVS may have a predetermined color distinguished from the plurality of lenses 220, but the present invention is not limited thereto. One side of the marking portion 230 may be parallel or perpendicular to the extending direction of the plurality of lenses 220. For example, the plurality of lenses 220 may extend in the V-axis direction, and the marking line UVS may extend in the W-axis direction perpendicular to the V-axis direction. The marking portion 230 may include a plurality of marking lines UVS spaced apart from each other, and the marking portion may be defined as an area between the plurality of marking lines UVS provided on at least one lens of the plurality of lenses 220. Accordingly, the marking portion 230 may correspond to an area surrounded by both sides of the at least one lens 220 and the plurality of marking lines UVS. The shape of the marking portion 230 may be substantially the same as that of the alignment mark area MA, but the present invention is not limited thereto.

The marking portion 230 may be disposed at the center of the stereoscopic lens 20. The marking portion 230 may be formed by applying a plurality of marking lines UVS having a predetermined color on the second lens 222 of the plurality of lenses 220. In this example, the marking portion 230 may be disposed between the first lens 221 and the third lens 223. The marking portion 230 may overlap the alignment mark area MA of the display panel 110. The marking portion 230 may output light incident from the display module 10 substantially unaltered. The marking portion 230 may have a rectangular shape in a plan view, but the shape thereof is not limited thereto. The marking portion 230 may be formed to correspond to the size of the alignment mark area MA including a plurality of pixels capable of forming alignment marks. Further, the shape of the marking portion 230 may be changed depending on the arrangement of a plurality of pixels capable of forming alignment marks.

The marking line UVS may include a material that is softened by light of a specific wavelength. The marking line UVS may have a solid state having a predetermined color before being softened, and may have a transparent liquid state immediately after being softened. The marking line UVS may include a polymer that is softened by ultraviolet rays. For example, the marking line UVS may have a predetermined color in the process of aligning the display module 10 and the stereoscopic lens 20, and may be softened by ultraviolet rays capable of curing the adhesive material between the display module 10 and the stereoscopic lens 20. The marking portion 230 may be softened in the process of aligning the display module 10 and the stereoscopic lens 20, thereby having a transparent state without an additional process and not deteriorating the image quality of the display device.

For example, the shapes of the alignment mark area MA and the marking portion 230 are not limited to the shapes shown in FIG. 2. The shapes of the alignment mark area MA and the marking portion 230 may be changed according to design conditions or needs, but the alignment function using the changed shapes may be maintained.

Figure 3:
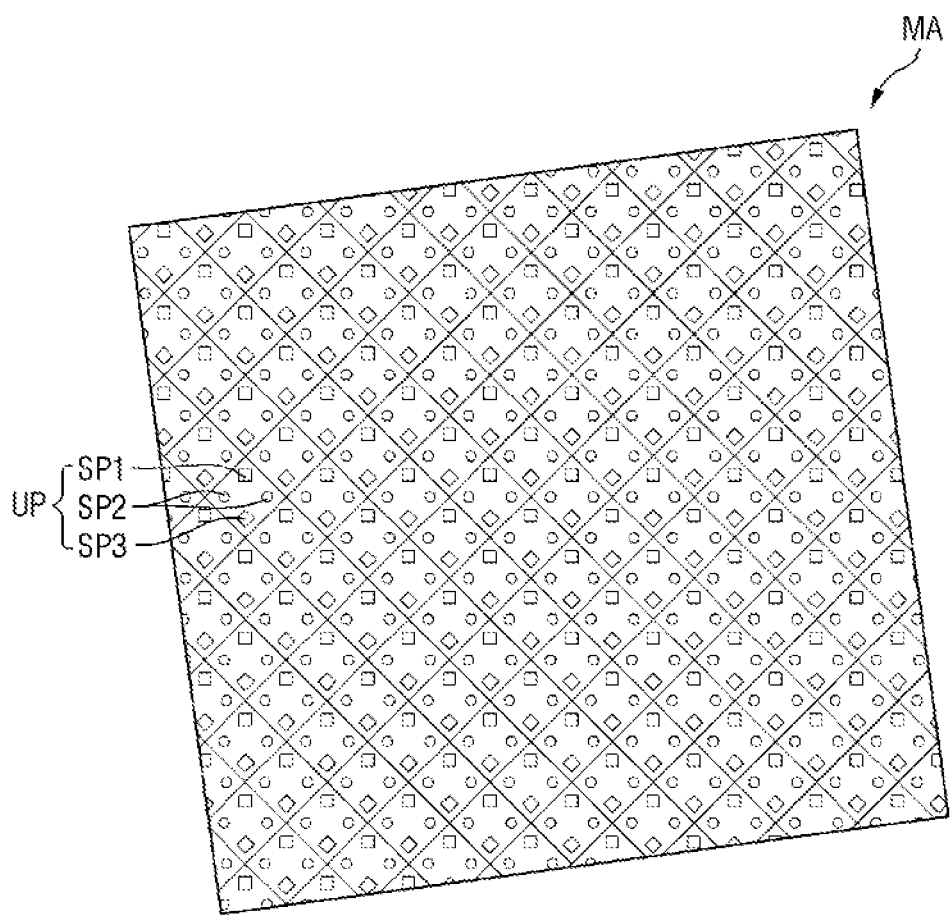
FIG. 3 is a plan view illustrating an alignment mark area of the display device according to an embodiment.

FIG. 3 is a plan view illustrating an alignment mark area of the display device according to an embodiment.

Referring to FIG. 3, the display area DA of the display panel 110 may include a plurality of unit pixels UP or a plurality of sub-pixels SP1, SP2, and SP3. The plurality of sub-pixels SP1, SP2, and SP3 may be arranged along a plurality of rows and a plurality of columns. The display area DA may include a larger number of unit pixels UP as the resolution of the display device increases.

Each of the plurality of unit pixels UP may include first to third sub-pixels SP1, SP2, and SP3 expressing different colors. The plurality of first to third sub-pixels SP1, SP2, and SP3 may be connected with the intersection of n (n is a natural number) data lines and m (m is a natural number) scan lines. Each of the plurality of sub-pixels may include a light emitting element and a pixel circuit. The pixel circuit may include a driving transistor, at least one switching transistor, and at least one capacitor, and may drive a light emitting element of each of the plurality of sub-pixels.

Each of the plurality of unit pixels UP may include one first sub-pixel SP1, two second sub-pixels SP2, and one third sub-pixel SP3, but the present invention is not limited thereto. Here, the first sub-pixel SP1 may be a red sub-pixel, the second sub-pixel SP2 may be a green sub-pixel, and the third sub-pixel SP3 may be a blue sub-pixel. The size of the opening of each of the first to third sub-pixels SP1, SP2, and SP3 may be determined according to the luminance of the corresponding light. Accordingly, the size of the opening of each of the first to third sub-pixels SP1, SP2, and SP3 may be adjusted to realize white light by mixing light emitted from each of the plurality of light emitting layers. Each of the first to third sub-pixels SP1, SP2, and SP3 may receive a data signal including gradation information of red, green, or blue light from the display driver 120 and output light of the corresponding color.

The alignment mark area MA may include some unit pixels among the plurality of unit pixels in the display area DA. Some unit pixels UP of the alignment mark area MA may be driven by the display driver 120 to form an alignment mark. The display driver 120 may supply a scan signal and a data voltage to a set of pixels UP forming an alignment mark in the process of bonding the display module 10 and the stereoscopic lens 20. For example, the alignment mark may have a cross shape, but the shape thereof is not limited thereto. The alignment mark may have a shape of a specific figure or a specific symbol by the driving of the display driver 120. The shape and size of the alignment mark may be changed according to the driving of the display driver 120.

Figure 4:
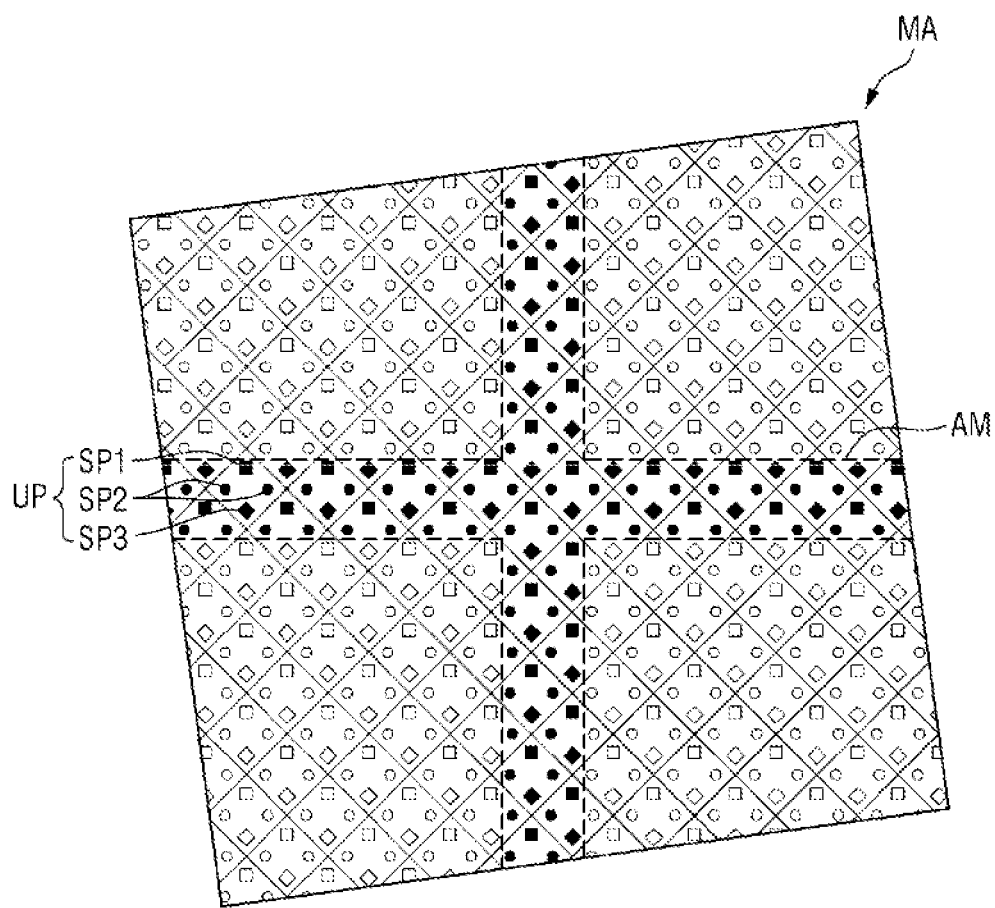
FIG. 4 is a view illustrating an example of an alignment mark in the display device according to an embodiment.

FIG. 4 is a view illustrating an example of an alignment mark in the display device according to an embodiment.

Referring to FIG. 4, the display driver 120 may form an alignment mark AM by driving the first to third sub pixels SP1, SP2, and SP3 arranged in a specific row in the alignment mark area MA and the first to third arranged in a specific column in the alignment mark area MA. For example, the display driver 120 may drive the first sub-pixels SP1 arranged in two rows and two columns intersecting the two rows, drive the second sub-pixels SP2 arranged in two rows and two columns intersecting the two rows, and drive the third sub-pixels SP3 arranged in two rows and two columns intersecting the two rows to form a white alignment mark AM having a cross shape (+). Here, since the first and third sub-pixels SP1 and SP3 may be alternately arranged in the same row and the same column, the display driver 120 may drive the first to third sub-pixels SP1, SP2, and SP3 arranged in four rows and four columns to form a white alignment mark AM having a cross shape (+).

For example, the size of the alignment mark AM may correspond to the size and number of predetermined pixels. As the number of the first to third sub-pixels SP1, SP2, and SP3 driven by the display driver 120 is reduced, the size of the alignment mark AM may be reduced. The display device may form an alignment mark AM using a set of pixels in the alignment mark area MA, thereby reducing the size of the alignment mark AM. As the size of the alignment mark AM is reduced, the size of the marking portion 230 corresponding to the size of the alignment mark AM may be reduced. As the sizes of the alignment mark AM and the marking portion 230 decreases, alignment precision may be improved. Therefore, the panel bonding system may improve alignment precision and reduce alignment time by aligning the alignment mark AM formed using the set of pixels in the display module 10 with the marking portion 230 of the stereoscopic lens 20.

For example, the panel bonding system may reduce panel bonding time and cost by omitting a separate additional adjustment process after the bonding process through alignment. As another example, the panel bonding system may maximize the alignment precision of the display module 10 and the stereoscopic lens 20 by performing an alignment process with improved precision and a separate adjustment process.

Figure 5:
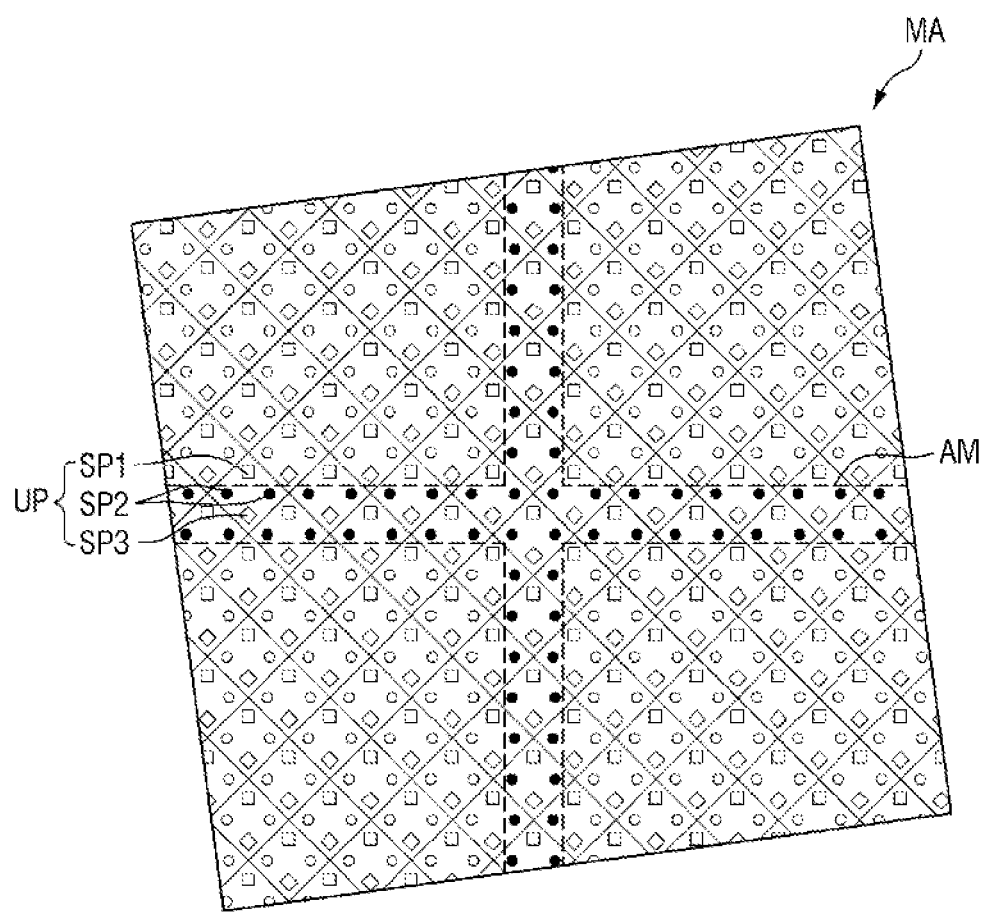
FIG. 5 is a view illustrating another example of an alignment mark in the display device according to an embodiment.

FIG. 5 is a view illustrating another example of an alignment mark in the display device according to an embodiment.

Referring to FIG. 5, the display driver 120 may form an alignment mark AM by driving specific kinds of sub-pixels among the first to third sub pixels SP1, SP2, and SP3 in the alignment mark area MA. For example, the display driver 120 may drive the second sub-pixels SP2 arranged in two rows and two columns intersecting the two rows to form a green alignment mark AM having a cross shape (+). As another example, the display driver 120 may drive the first sub-pixels SP1 arranged in two rows and two columns intersecting the two rows to form a red alignment mark AM having a cross shape (+). As another example, the display driver 120 may drive the third sub-pixels SP3 arranged in two rows and two columns intersecting the two rows to form a blue alignment mark AM having a cross shape (+).

Accordingly, the panel bonding system may improve alignment precision by aligning the alignment mark AM formed using a set of pixels in the display module 10 with the marking portion 230 of the stereoscopic lens 20. For example, the panel bonding system may reduce panel bonding time and cost by omitting a separate additional adjustment process after the bonding process through alignment. As another example, the panel bonding system may maximize the alignment precision of the display module 10 and the stereoscopic lens 20 by performing an alignment process with improved precision and a separate adjustment process.

Figure 6:
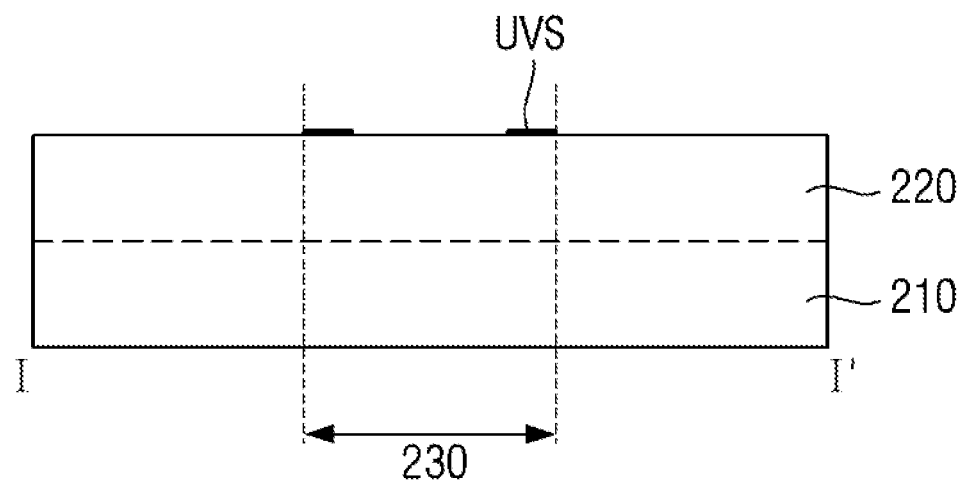
FIG. 6 is a cross-sectional view of the stereoscopic lens taken along the line I-I' of FIG. 2.

FIG. 6 is a cross-sectional view of the stereoscopic lens taken along the line I-I' of FIG. 2.

Referring to FIG. 6, the stereoscopic lens 20 may be disposed on the display module 10. The stereoscopic lens 20 may be attached to one surface of the display module 10 through an adhesive member. The stereoscopic lens 20 may be bonded to the display module 10 by a panel bonding apparatus. For example, the stereoscopic lens 20 may be implemented as a lenticular lens sheet including a plurality of lenses 220, but the present invention is not limited thereto. The stereoscopic lens 20 may include a base 210, a plurality of lenses 220, and a marking portion 230.

The base 210 may be directly disposed on the upper surface of the display module 10. For example, one surface of the base 210 facing the display module 10 and the other surface of the base 210 opposite to one surface of the base 210 may be parallel to each other. The base 210 may output light incident from the display module 10 substantially unaltered. The direction of light passing through one surface of the base 210 may coincide with the direction of light passing through the other surface of the base 210. The base 210 may be integrally formed with the plurality of lenses 220, but the present invention is not limited thereto.

The plurality of lenses 220 may be disposed on the base 210 to change the direction of light incident from the display module 10. The light incident from the display module 10 may pass through the base 210 to reach the plurality of lenses 220.

The plurality of lenses 220 may be integrally formed with the base 210. For example, the plurality of lenses 220 may be formed on the upper surface of the base 210 by embossing. The plurality of lenses 220 may be half-cylindrical lenses, but are not limited thereto. As another example, the plurality of lenses 220 may be manufactured separately from the base 210 and then attached to the base 210.

The marking portion 230 may be formed on some lenses of the plurality of lenses 220 to overlap the alignment mark area MA. The marking portion 230 may include a marking line UVS disposed in a direction perpendicular to the extending direction of the plurality of lenses 220. The marking line UVS may have a predetermined color distinguished from the plurality of lenses 220, but the present invention is not limited thereto. The marking portion 230 may include a plurality of marking lines UVS spaced apart from each other, and the marking portion may be defined as an area between the plurality of marking lines UVS provided on at least one lens of the plurality of lenses 220. Accordingly, the marking portion 230 may correspond to an area surrounded by both sides of the at least one lens 220 and the plurality of marking lines UVS. The shape of the marking portion 230 may be the same as that of the alignment mark area MA, but the present invention is not limited thereto.

The marking portion 230 may be formed by applying a plurality of marking lines UVS having a predetermined color on some lenses of the plurality of lenses 220. The marking portion 230 may overlap the alignment mark area MA of the display panel 110. The marking portion 230 may output light incident from the display module 10 substantially unaltered. The marking portion 230 may have a rectangular shape in a plan view, but the shape thereof is not limited thereto. The marking portion 230 may be formed to correspond to the size of the alignment mark area MA including a plurality of pixels capable of forming alignment marks. Further, the shape of the marking portion 230 may be changed depending on the arrangement of a plurality of pixels capable of forming alignment marks.

The marking line UVS may include a material that is softened by light of a specific wavelength. The marking line UVS may have a solid state having a predetermined color before being softened, and may have a transparent liquid state immediately after being softened. The marking line UVS may include a polymer that is softened by ultraviolet rays. For example, the marking line UVS may have a predetermined color in the process of aligning the display module 10 and the stereoscopic lens 20, and may be softened by ultraviolet rays that are capable of curing the adhesive material between the display module 10 and the stereoscopic lens 20. The marking portion 230 may be softened in the process of aligning the display module 10 and the stereoscopic lens 20, thereby having a transparent state without an additional process and not deteriorating the image quality of the display device.

Figure 7:
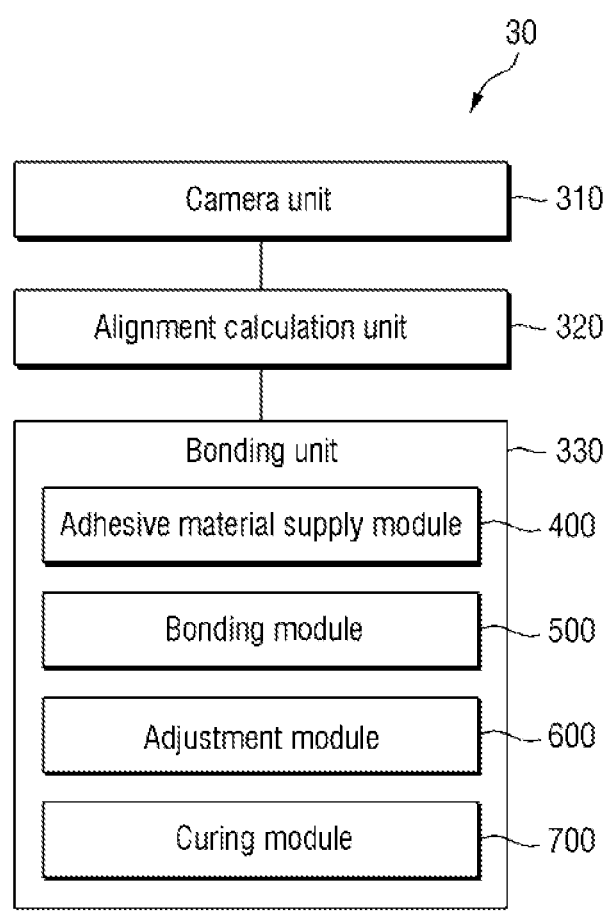
FIG. 7 is a block diagram illustrating a panel bonding apparatus of a panel bonding system according to an embodiment.

FIG. 7 is a block diagram illustrating a panel bonding apparatus of a panel bonding system according to an embodiment.

Referring to FIG. 7, a panel bonding apparatus 30 may include a camera unit 310, an alignment calculation unit 320, and a bonding unit 330.

The camera unit 310 may generate image data by photographing the alignment between the marking portion 230 and the alignment mark AM. The camera unit 310 may be disposed at one side of the bonding unit 330. For example, the camera unit 310 may photograph the stereoscopic lens 20 and the display module 10 from above the stereoscopic lens 20 before bonding the display module 10 and the stereoscopic lens 20. The position of the camera unit 310 is not limited to above the stereoscopic lens 20. In some examples, the camera unit 310 may be disposed at a place where the marking portion 230 of the stereoscopic lens 20 and the alignment mark AM of the display module 10 can be photographed. The camera unit 310 may supply image data about the alignment process to the alignment calculation unit 320.

The alignment calculation unit 320 may calculate a horizontal distance or a vertical distance for adjusting alignment based on the image data to generate alignment data. For example, the alignment calculation unit 320 may calculate a distance between the stereoscopic lens 20 and the display module 10 based on the image data received from the camera unit 310. Here, the distance between the stereoscopic lens 20 and the display module 10 may correspond to a distance between the center of the marking portion 230 and the center of the alignment mark AM. The alignment calculation unit 320 may supply the alignment data to the bonding unit 330, and the bonding unit 330 may accurately align the display module 10 and the stereoscopic lens 20 based on the alignment data.

The bonding unit 330 may move the stereoscopic lens 20 in the first direction (X-axis direction) or the second direction (Y-axis direction) based on the alignment data to align the stereoscopic lens 20 and the display module 10. The bonding unit 330 may complete alignment by attaching the stereoscopic lens 20 to the upper surface of the display module 10 provided with an adhesive member. The bonding unit 330 may adjust the position of the stereoscopic lens 20 until the position of the alignment mark AM of the display module 10 exactly coincides with the position of the marking portion 230 of the stereoscopic lens 20.

For example, the bonding unit 330 may include an adhesive material supply module 400, a bonding module 500, and a curing module 700. In this example, the panel bonding apparatus 30 may bond the display module 10 and the stereoscopic lens 20 by omitting the process of an adjustment module 600. Therefore, the panel bonding system may improve alignment precision by aligning the alignment mark formed using a set of pixels in the display module 10 with the marking portion 230 of the stereoscopic lens 20. The panel bonding system may reduce panel bonding time and cost by omitting a separate additional adjustment process after the bonding process through alignment.

As another example, the bonding unit 330 may further include an adjustment module 600. In this example, the panel bonding system may further improve the alignment precision. Accordingly, the panel bonding system may maximize the alignment precision, and may reduce precise alignment time by efficiently using the bonding module 500 and the adjustment module 600.

The adhesive material supply module 400, the bonding module 500, the adjustment module 600, and the curing module 700 will be described in detail with reference to FIGS. 8, 9, 11, and 13, respectively.

Figure 8:
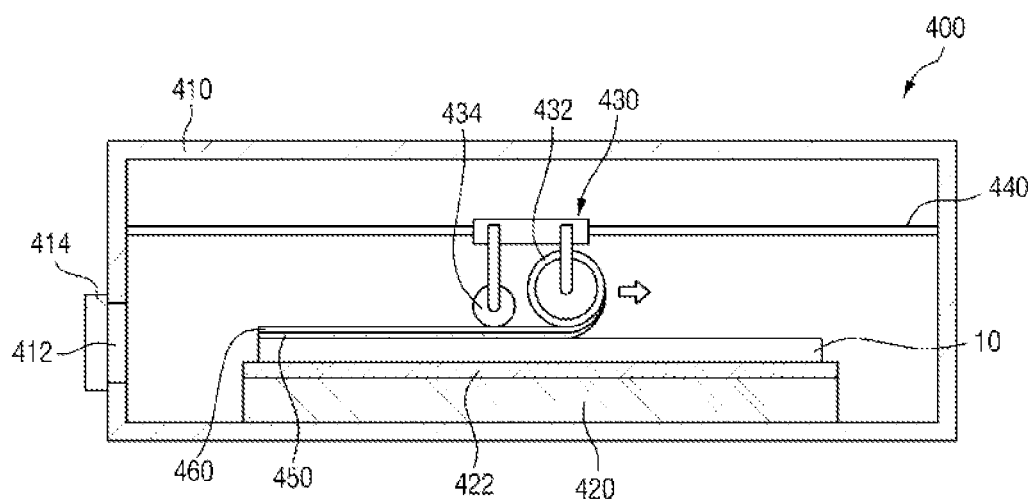
FIG. 8 is a view illustrating an adhesive material supply module of the panel bonding apparatus according to an embodiment.

FIG. 8 is a view illustrating an adhesive material supply module of the panel bonding apparatus according to an embodiment.

Referring to FIG. 8, in the adhesive material supply module 400, an adhesive member 450 may be attached to one surface of the display module 10. The adhesive material supply module 400 may include an adhesion chamber 410, an adhesion stage 420, a moving unit 430, and a guide rail 440.

The adhesion chamber 410 may provide a space for attaching the adhesive member 450 on the display module 10. The adhesion chamber 410 may include an input port 412 and an input door 414. The display module 10 may be provided inside the adhesion chamber 410 through the input port 412. When the preparation of the display module 10 and the adhesive member 450 is completed, the input door 414 may seal the adhesion chamber 410 to provide a space for attaching the adhesive member.

The adhesion stage 420 may be disposed on the bottom of the adhesion chamber 410 inside the adhesion chamber 410. The display module 10 may be disposed on one surface of the adhesion stage 420 to be supported by the adhesion stage 420. The adhesion stage 420 may have a fixing portion 422 that fixes the display module 10 and may provide for the display module 10 not to move on the adhesion stage 420. Further, the fixing portion 422 may be implemented as an electrostatic chuck using an electrostatic force or a porous chuck using a vacuum adsorption force.

The moving unit 430 may reciprocate over the adhesion stage 420. The moving unit 430 may attach the adhesive member 450 to the entire one surface of the display module 10 while reciprocating along the guide rail 440. The moving unit 430 may include a bobbin 432 and a pressing roller 434. The bobbin 432 is rotated by the movement of the moving unit 430 to supply the adhesive member 450 wound on the adhesive surface of the display module 10 mounted on the adhesion stage 420. The pressing roller 434 may press the adhesive member 450 supplied to the adhesive surface of the display module 10 to attach the adhesive member to the display module 10.

The bobbin 432 and the pressure roller 434 may attach a release member 460 to the other surface of the adhesive member 450 opposite to one surface of the adhesive member 450 facing the adhesive surface of the display module 10. The release member 460 may help maintain the adhesive force of the other surface of the adhesive member 450 in the process of attaching one surface of the adhesive member 450 to the adhesive surface of the display module 10. The release member 460 may be removed after the adhesive member 450 is attached to the display module 10, and the other surface of the adhesive member 450, from which the release member 460 was removed, may face the stereoscopic lens 20 in the bonding module 500. In some cases, the inclusion of a release member in the paneling bonding process may provide for a better resultant adhesion between the display module and the stereoscopic lens.

The guide rail 440 may provide a path through which the moving unit 430 reciprocates. The guide rail 440 may extend from one side surface of the adhesion chamber 410 to the other side surface of the adhesion chamber opposite to one side surface thereof. The guide rail 440 may be disposed along a straight line, so that the moving unit 430 may attach the adhesive member 450 onto the display module 10 in one movement.

Figure 9:
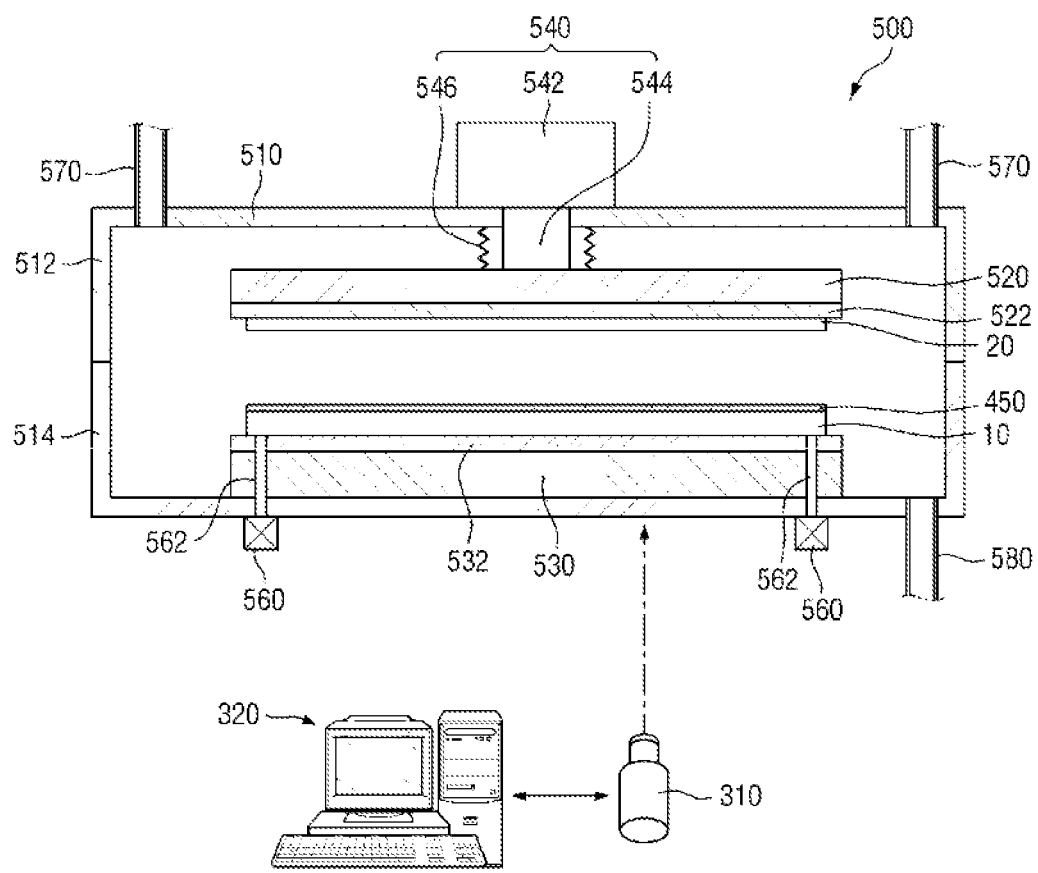
FIG. 9 is a view illustrating a bonding module of the panel bonding apparatus according to an embodiment.
Figure 10:
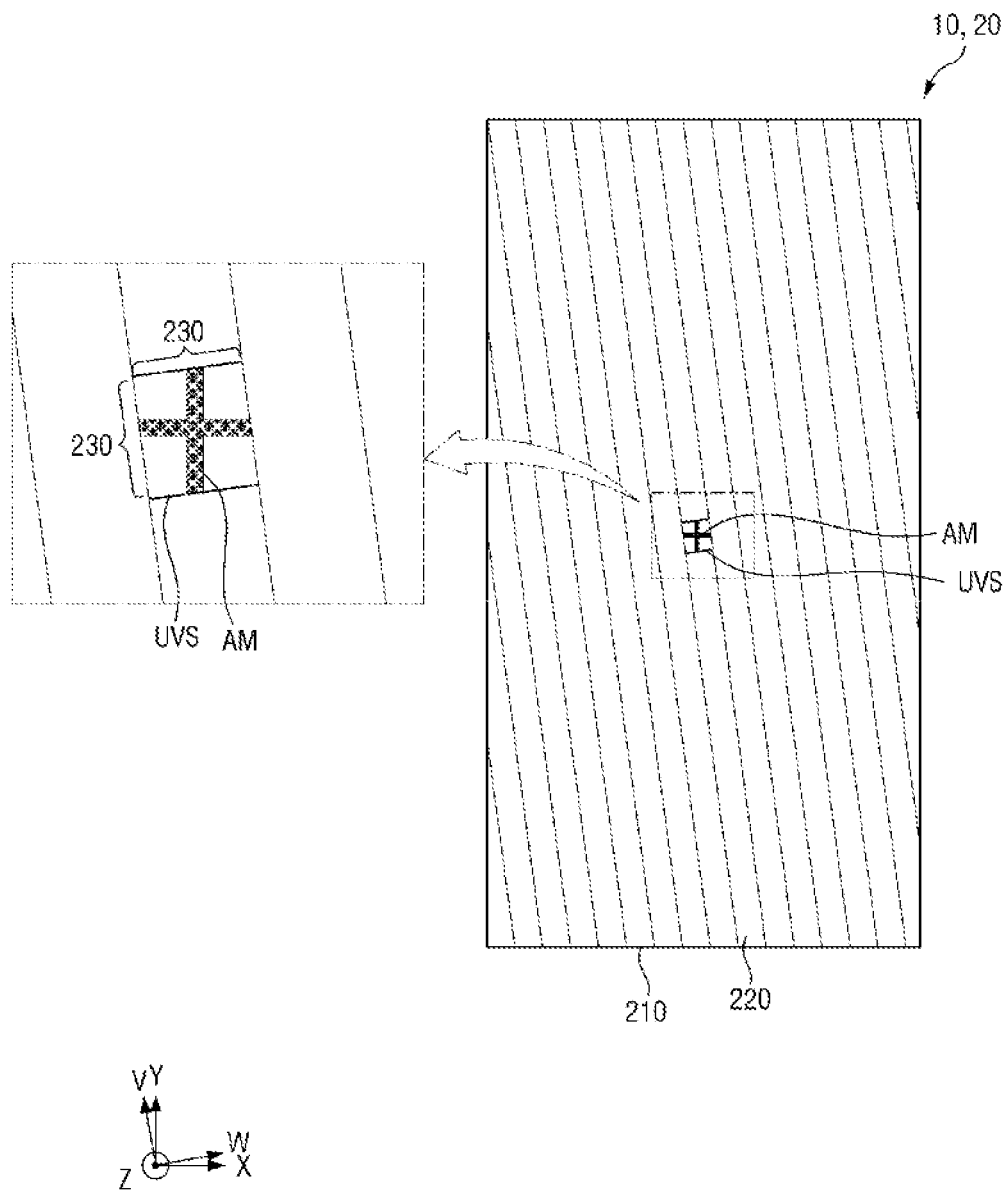
FIG. 10 is a view illustrating the alignment of an alignment mark and a marking portion in the panel bonding system according to an embodiment.

FIG. 9 is a view illustrating a bonding module of the panel bonding apparatus according to an embodiment, and FIG. 10 is a view illustrating the alignment of an alignment mark and a marking portion in the panel bonding system according to an embodiment.

Referring to FIGS. 9 and 10, the bonding module 500 may bond one surface of the display module 10 provided with the adhesive member 450 to the stereoscopic lens 20. The bonding module 500 may bond the display module 10 to the stereoscopic lens 20 by aligning the alignment mark AM of the display module 10 with the marking portion 230 of the stereoscopic lens 20 based on the alignment data.

The bonding module 500 may include a bonding chamber 510, an upper stage 520, a lower stage 530, and a lifting unit 540.

The bonding chamber 510 may provide a space for bonding the display module 10 and the stereoscopic lens 20. The bonding chamber 510 may include a separable upper chamber 512 and a separable lower chamber 514. The upper chamber 512 and the lower chamber 514 may be separated before a bonding process proceeds, the lower stage 530 may be provided with the display module 10, and the upper stage 520 may be provided with the stereoscopic lens 20. The upper chamber 512 and the lower chamber 514 may be separated after the bonding process is completed, and the bonded display device may be discharged.

The upper stage 520 may be moved up and down by the lifting unit 540 at the inner upper portion of the bonding chamber 510. The upper stage 520 may be disposed at the inner upper portion of the upper chamber 512, and may be supported to be shifted up and down by the lifting unit 540. The lower surface of the upper stage 520 may include a stereoscopic lens attachment portion 522. For example, the stereoscopic lens attachment portion 522 may be implemented as an electrostatic chuck using an electrostatic force or a porous chuck using a vacuum adsorption force.

The lower stage 530 may be disposed to correspond to the upper stage 520 at the inner lower portion of the bonding chamber 510. The lower stage 530 may be disposed at the inner lower portion of the lower chamber 514, and the upper surface of the lower stage 530 may include a display module attachment portion 532. For example, the display module attachment portion 532 may be implemented as an electrostatic chuck using an electrostatic force or a porous chuck using a vacuum adsorption force.

The lifting unit 540 may move the upper stage 520 up from the lower stage 530. The lifting unit 540 may be provided between the upper chamber 512 and the upper stage 520 to move the upper stage 520 down toward the lower stage 530. The lifting unit 540 may include a lifting actuator 542, a lifting shaft 544, and a bellows 546. The lifting actuator 542 may move up and down to move the upper stage 520 up and down. The lifting shaft 544 may connect the lifting actuator 542 and the upper stage 520. The bellows 546 may be provided on the outer circumference of the lifting shaft 544 to maintain the vacuum or pressure difference in the bonding chamber 510 through volume change.

For example, the lifting unit 540 may be connected to the upper stage 520 to move the upper stage 520 down toward the lower stage 530. As another example, the lifting unit 540 may be connected to the lower stage 530 to move the lower stage 530 up toward the upper stage 520.

The bonding module 500 may further include a lighting device 560, an exhaust pipe 570, and a supply pipe 580. The lighting device 560 may provide a light source for allowing the camera unit 310 to photograph the alignment mark AM of the display module 10 and the marking portion 230 of the stereoscopic lens 20. The lower stage 530 may further include a lighting hole 562 for the lighting device 560.

The exhaust pipe 570 and the supply pipe 580 may form a bonding environment in a bonding space inside the bonding chamber 510. When the display module 10 and the stereoscopic lens 20 are put into the bonding chamber 510, the exhaust pipe 570 may be connected to a pump (not shown) to convert the bonding space to a vacuum state. When the display module 10 is in contact with the stereoscopic lens 20, the supply pipe 580 may be connected to a gas supply source (not shown) to receive a process gas, and the process gas may pressurize the display module 10 or the stereoscopic lens 20. For example, the process gas may contain nitrogen ($N_2$).

Figure 11:
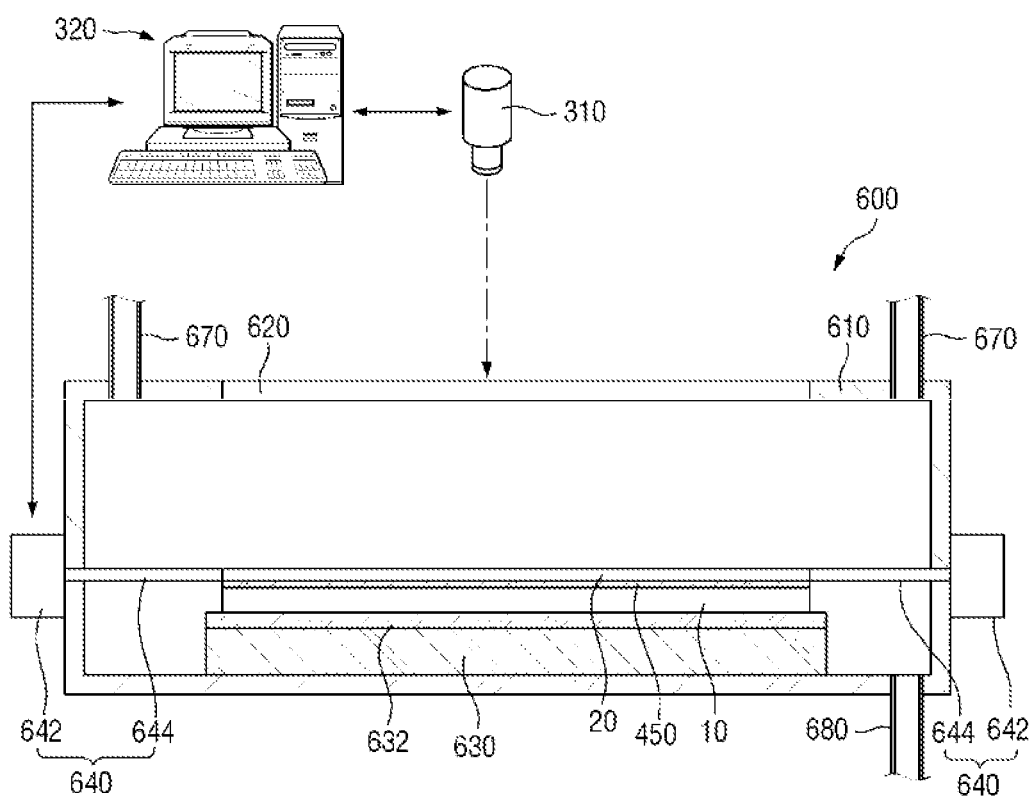
FIG. 11 is a view illustrating an adjustment module of the panel bonding apparatus according to an embodiment.
Figure 12:
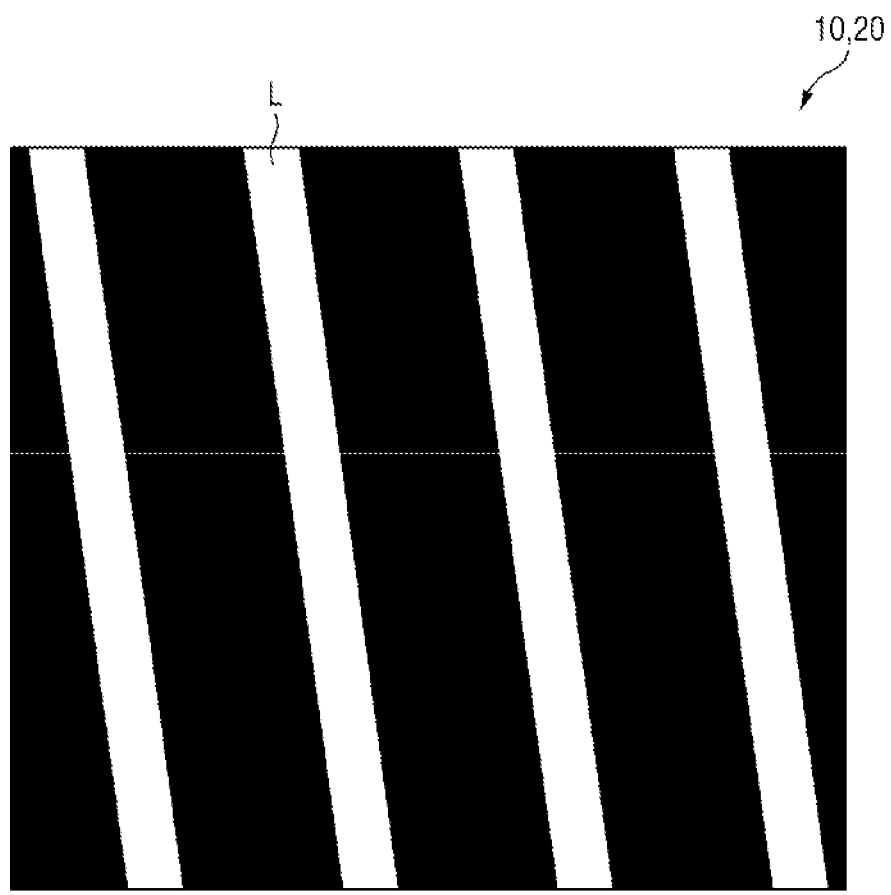
FIG. 12 is a view illustrating the light output of a display module in the panel bonding system according to an embodiment.

FIG. 11 is a view illustrating an adjustment module of the panel bonding apparatus according to an embodiment, and FIG. 12 is a view illustrating the light output of a display module in the panel bonding system according to an embodiment.

Referring to FIGS. 11 and 12, the adjustment module 600 may further adjust the position of the display module 10 after the alignment of the display module 10 and the stereoscopic lens 20 is adjusted by the bonding module 500 to finely adjust the alignment of the display module 10 and the stereoscopic lens 20. For example, the adjustment module 600 may finely adjust the alignment of the display module 10 and the stereoscopic lens 20 until the light output L of the display module 10 having passed through the stereoscopic lens 20 has a clear line shape as shown in FIG. 12. When the display module 10 and the stereoscopic lens 20 are misaligned, the light output of the display device may have a blurry line shape or a distorted line shape. Accordingly, examples of the panel bonding system maximize the alignment precision between the display module 10 and the stereoscopic lens.

The adjustment module 600 may include an adjustment chamber 610, a window 620, an adjustment stage 630, and a position adjustment unit 640.

The adjustment chamber 610 may provide a space for finely adjusting the alignment of the display module 10 and the stereoscopic lens 20. For example, the adjustment chamber 610 is implemented as a separable upper chamber and a separable lower chamber, and thus the attached display device may be brought in and out. Here, the display device may include the display module 10 and the stereoscopic lens 20 which are bonded by the adhesive member 450. As another example, the window may be detached from the adjustment chamber 610, and thus the attached display device may be brought in and out.

The window 620 may be provided at a part of the upper surface of the adjustment chamber 610. The window 620 may be disposed between the camera unit 310 and the screen of the display device to secure the field of view of the camera unit 310. The camera unit 310 may photograph the light output L of the display device through the window 620.

The adjustment stage 630 may be disposed at the inner lower portion of the adjustment chamber 610 to support the display device. The upper surface of the adjustment stage 630 may include a display device attachment portion 632. For example, the display device attachment portion 632 may be implemented as an electrostatic chuck using an electrostatic force or a porous chuck using a vacuum adsorption force.

The position adjustment unit 640 may finely move the position of the stereoscopic lens 20 in the first direction (X-axis direction) or the second direction (Y-axis direction). For example, the position adjustment unit 640 may be disposed on one side surface of the adjustment chamber 610 and the other side surface of the adjustment chamber 160 perpendicular to one side surface thereof. As another example, the position adjustment unit 640 may be disposed on all side surfaces of the adjustment chamber 610. The position adjustment unit 640 may include a moving body 642 and a moving shaft 644. The moving body 642 may finely move the position of the stereoscopic lens 20 on a plane. The moving shaft 644 may connect the moving body 642 and the stereoscopic lens 20.

The adjustment module 600 may further include an exhaust pipe 670 and a supply pipe 680. The exhaust pipe 670 and the supply pipe 680 may provide for an adjustment environment in a space inside the adjustment chamber 610. When the display module 10 is put into the adjustment chamber 610, the exhaust pipe 670 may be connected to a pump (not shown) to remove gas and/or air from the bonding space. Accordingly, the bonding space may be depressurized into a vacuum state. When the fine adjustment of the alignment of the display device, the supply pipe 680 may be connected to a gas supply source (not shown) to receive a process gas, and the process gas may pressurize the display device.

Figure 13:
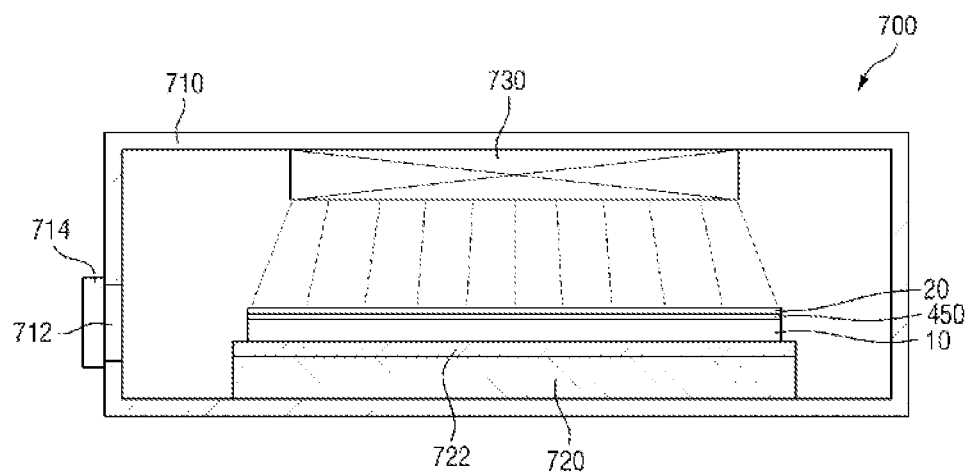
FIG. 13 is a view illustrating a curing module of the panel bonding apparatus according to an embodiment.
Figure 14:
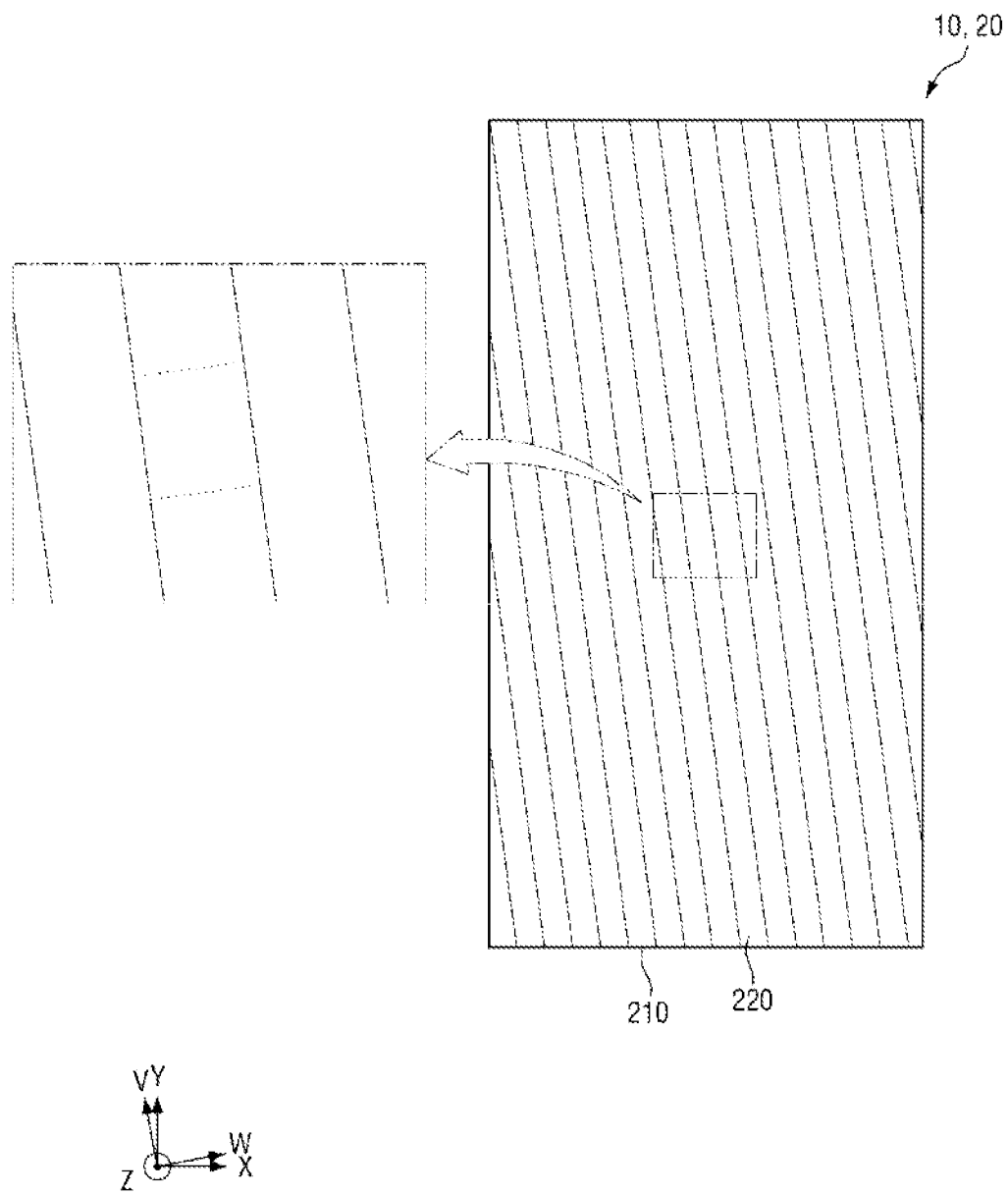
FIG. 14 is a plan view illustrating a state in which a marking line is softened in the panel bonding system according to an embodiment.

FIG. 13 is a view illustrating a curing module of the panel bonding apparatus according to an embodiment, and FIG. 14 is a plan view illustrating a state in which a marking line is softened in the panel bonding system according to an embodiment.

Referring to FIGS. 13 and 14, the curing module 700 may cure the adhesive member 450 between the display module 10 and the stereoscopic lens 20. The curing module 700 may include a curing chamber 710, a curing stage 720, and a curing machine 730.

The curing chamber 710 may provide a space for curing the adhesive member 450. The curing chamber 710 may include an input port 712 and an input door 714. The display device may be provided inside the curing chamber 710 through the input port 712. When the preparation for curing is completed, the input door 714 may seal the curing chamber 710 to provide a space for curing the adhesive member 450.

The curing stage 720 may be disposed at the inner lower portion of the curing chamber 710. The display device may be disposed on one surface of the curing stage 720 to be supported by the curing stage 720. The curing stage 720 may include a fixing portion 722 to hold the display device in place during a curing process. For example, the fixing portion 722 may be implemented as an electrostatic chuck using an electrostatic force or a porous chuck using a vacuum adsorption force.

The curing machine 730 may apply ultraviolet rays to the adhesive member 450 of the display device provided on the curing stage 720. The marking line UVS may be softened by ultraviolet rays of the curing machine 730. Accordingly, the curing machine 730 may soften the marking line UVS while curing the adhesive member 450. The marking line UVS may be used for alignment of the display module 10 and the stereoscopic lens 20 before the curing process of the adhesive member 450. After the alignment and bonding of the display module 10 and the stereoscopic lens 20 are completed, the marking line UVS is softened in the curing process of the adhesive member 450, so as to have a transparent state without a separate process as shown in FIG. 14. Since the marking line UVS of the display device is softened by light of a specific wavelength and rendered substantially transparent, the image quality of the display device may not be deteriorated even when the marking portion 230 is disposed on the stereoscopic lens 20.

For example, the curing machine 730 is supported by a separate lifting device (not shown), and may be lifted down toward the curing stage 720. The distance between the curing machine 730 and the display device may be adjusted by a lifting device (not shown), and thus the curing machine 730 may adjust the degree of curing of the adhesive member 450.

Figure 15:
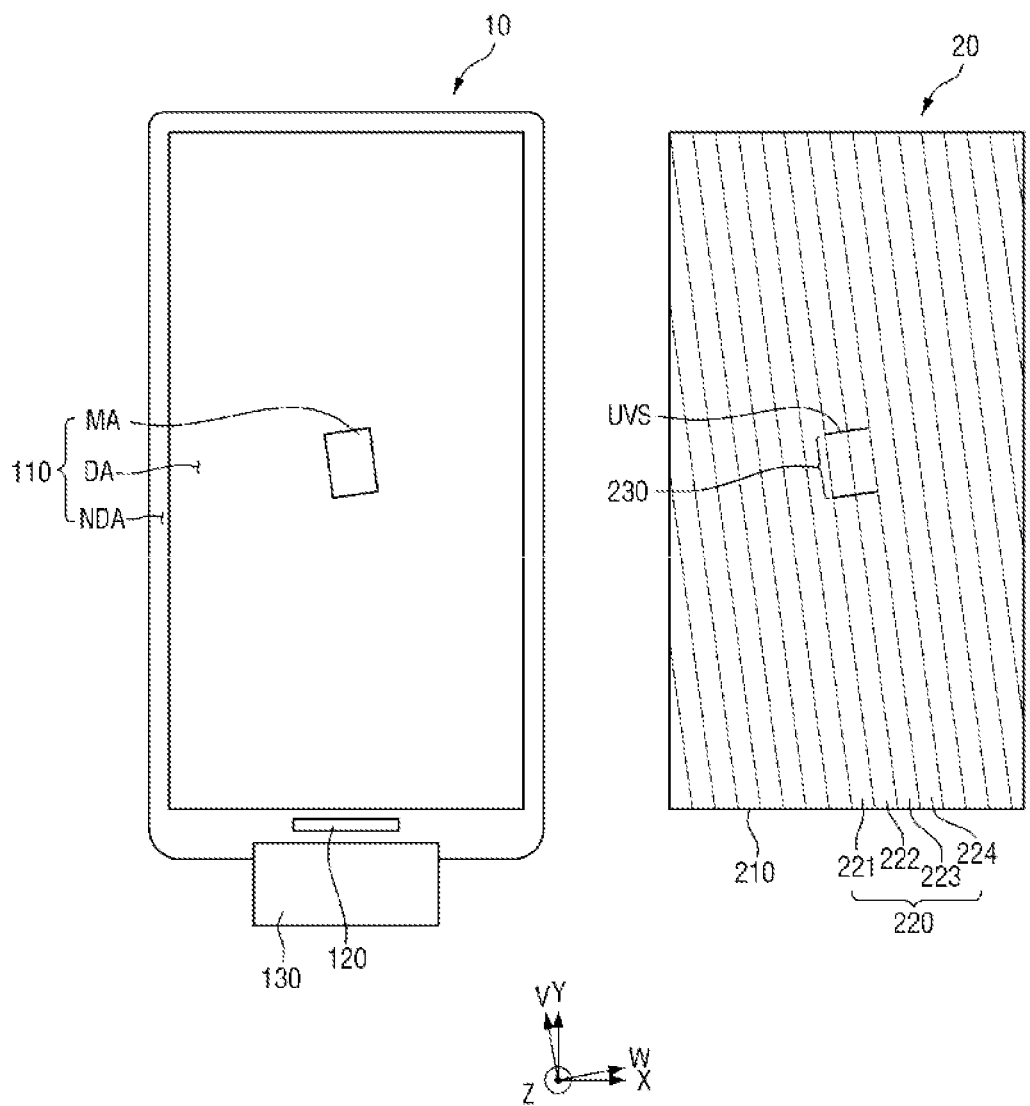
FIG. 15 is a plan view illustrating a display module and a stereoscopic lens of the display device according to another embodiment.

FIG. 15 is a plan view illustrating a display module and a stereoscopic lens of the display device according to another embodiment. The display device of FIG. 15 may be different from the display device of FIG. 2 in the shapes of the alignment mark area MA and the marking portion 230. Configurations identical to those described above will be briefly described or omitted.

Referring to FIG. 15, the display panel 110 may include a display area DA, an alignment mark area MA, and a non-display area NDA. The alignment mark area MA may be disposed in the display area DA. The planar shape of the alignment mark area MA may correspond to the planar shape of the marking portion 230 of the stereoscopic lens 20.

The stereoscopic lens 20 may be disposed on the display module 10. In some embodiments, the stereoscopic lens 20 is implemented as a lenticular lens sheet, and the stereoscopic lens 20 may include a base 210, a plurality of lenses 220, and a marking portion 230. The plurality of lenses 220 may include first to fourth lenses 221 to 224.

The marking portion 230 may be formed on some lenses of the plurality of lenses 220 to overlap the alignment mark area MA. The marking portion 230 may include a marking line UVS disposed in a direction perpendicular to the extending direction of the plurality of lenses 220. The marking portion 230 may be formed by applying a plurality of marking lines UVS on the second lens 222. The marking portion 230 may include a plurality of marking lines UVS spaced apart from each other, and the marking portion 230 may be defined as an area between the plurality of marking lines UVS provided on at least one lens of the plurality of lenses 220.

The marking portion 230 may be formed by applying a plurality of marking lines UVS having a predetermined color on some of the lenses 220. For example, the plurality of marking lines UVS may be applied on the second and third lenses 222 and 223. In this example, the marking portion 230 may be disposed between the first and fourth lenses 221 and 224. One side of the marking portion 230 may be parallel to the extending direction or V-axis direction of the plurality of lenses 220, and the other side of the marking portion 230, wherein the other side of the marking portion 230 is perpendicular to one side of the marking portion 230, may be perpendicular to the extending direction of the plurality of lenses 220. For example, when the length of one side of the marking portion 230 is different from the length of the other side thereof, the long side of the marking unit 230 may be parallel to the extending direction of the plurality of lenses 220. As another example, when the length of one side of the marking portion 230 is different from the length of the other side thereof, the short side of the marking portion 230 may be parallel to the extending direction of the plurality of lenses 220.

Figure 16:
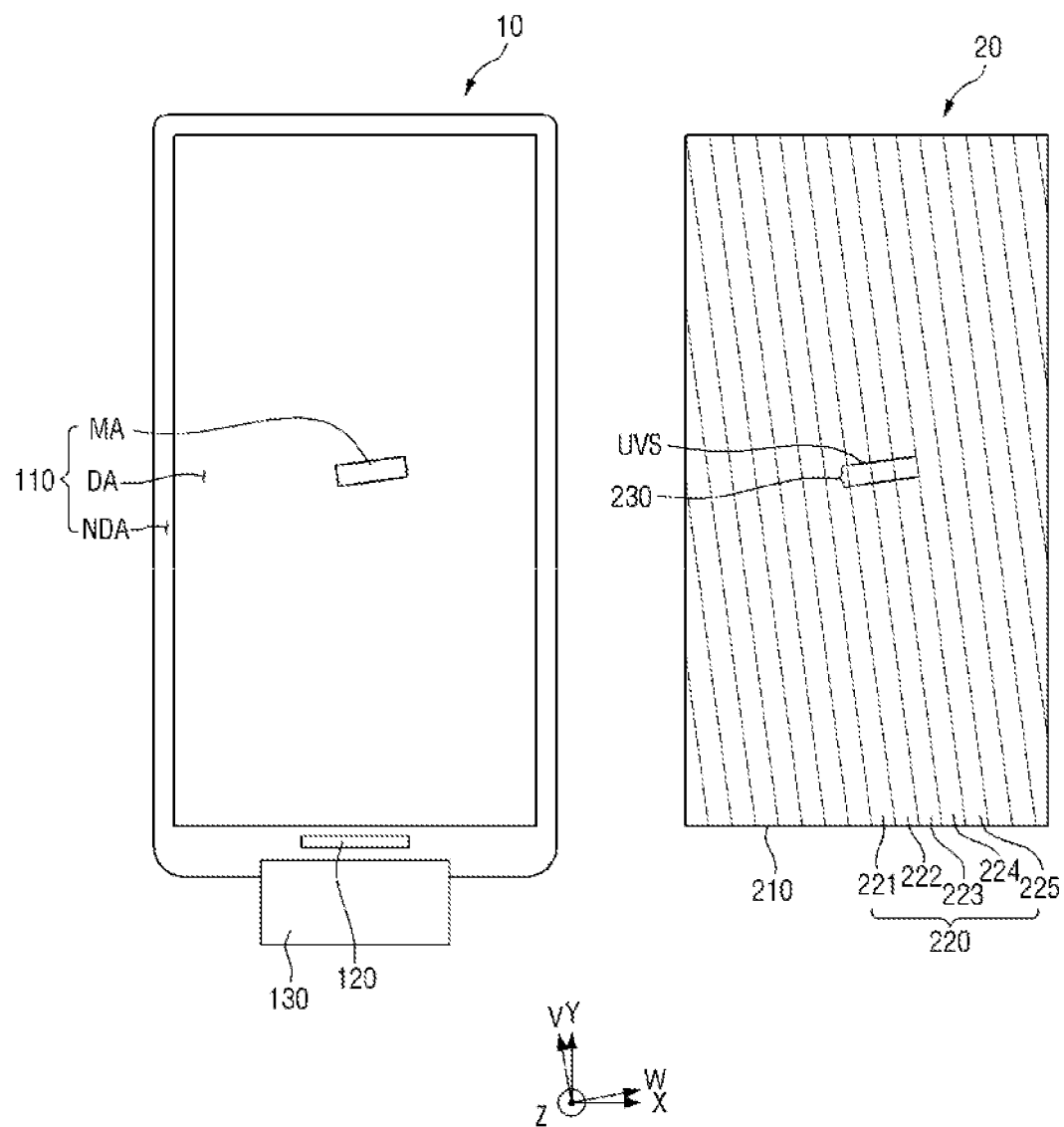
FIG. 16 is a plan view illustrating a display module and a stereoscopic lens of the display device according to another embodiment.

FIG. 16 is a plan view illustrating a display module and a stereoscopic lens of the display device according to another embodiment. The display device of FIG. 16 may be different from the display device of FIGS. 2 and 15 in the shapes of the alignment mark area MA and the marking portion 230. Configurations identical to those described above will be briefly described or omitted.

Referring to FIG. 16, the display panel 110 may include a display area DA, an alignment mark area MA, and a non-display area NDA. The alignment mark area MA may be disposed in the display area DA. The planar shape of the alignment mark area MA may correspond to the planar shape of the marking portion 230 of the stereoscopic lens 20.

The stereoscopic lens 20 may be disposed on the display module 10. When the stereoscopic lens 20 is implemented as a lenticular lens sheet, the stereoscopic lens 20 may include a base 210, a plurality of lenses 220, and a marking portion 230. The plurality of lenses 220 may include first to fifth lenses 221 to 225.

The marking portion 230 may be formed on some lenses of the plurality of lenses 220 to overlap the alignment mark area MA. The marking portion 230 may include a marking line UVS disposed in a direction perpendicular to the extending direction of the plurality of lenses 220. The marking portion 230 may be formed by applying a plurality of marking lines UVS on the second lens 222. The marking portion 230 may include a plurality of marking lines UVS spaced apart from each other, and the marking portion 230 may be defined as an area between the plurality of marking lines UVS provided on at least one lens of the plurality of lenses 220.

The marking portion 230 may be formed by applying a plurality of marking lines UVS having a predetermined color on some of the lenses 220. For example, the plurality of marking lines UVS may be applied on the second, third, and fourth lenses 222, 223, and 224. In this example, the marking portion 230 may be disposed between the first and fifth lenses 221 and 225. One side of the marking portion 230 may be parallel to the extending direction of the plurality of lenses 220, and the other side of the marking portion 230 perpendicular to one side of the marking portion 230 may be perpendicular to the extending direction of the plurality of lenses 220. For example, when the length of one side of the marking portion 230 is different from the length of the other side thereof, the long side of the marking unit 230 may be parallel to the extending direction of the plurality of lenses 220. As another example, when the length of one side of the marking portion 230 is different from the length of the other side thereof, the short side of the marking portion 230 may be parallel to the extending direction of the plurality of lenses 220.

Figure 17:
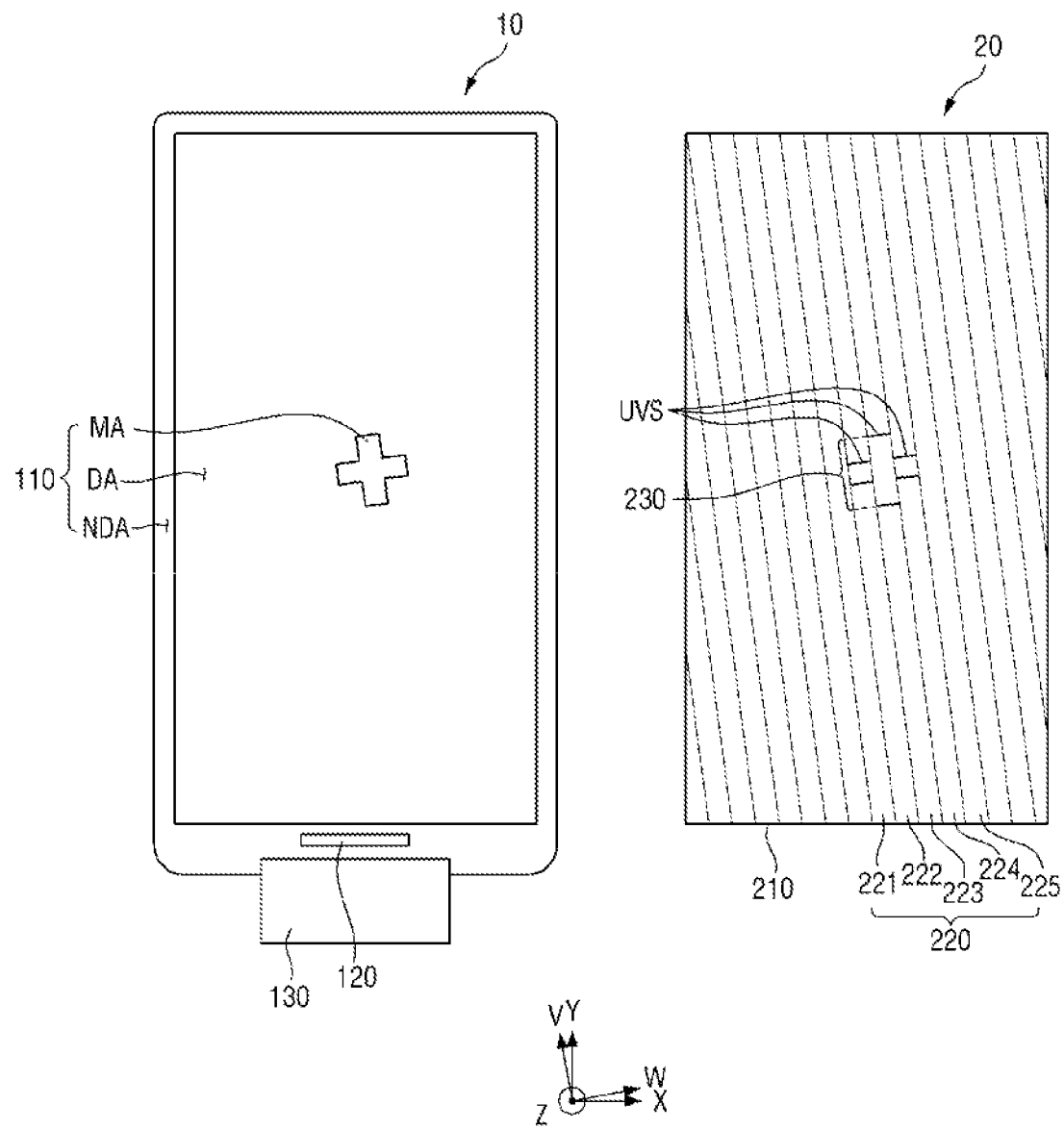
FIG. 17 is a plan view illustrating a display module and a stereoscopic lens of the display device according to another embodiment.

FIG. 17 is a plan view illustrating a display module and a stereoscopic lens of the display device according to another embodiment. The display device of FIG. 16 may be different from the display device of FIGS. 2, 15, and 16 in the shapes of the alignment mark area MA and the marking portion 230. Configurations identical to those described above will be briefly described or omitted.

Referring to FIG. 17, the display panel 110 may include a display area DA, an alignment mark area MA, and a non-display area NDA. The alignment mark area MA may be disposed in the display area DA. The planar shape of the alignment mark area MA may correspond to the planar shape of the marking portion 230 of the stereoscopic lens 20.

The stereoscopic lens 20 may be disposed on the display module 10. When the stereoscopic lens 20 is implemented as a lenticular lens sheet, the stereoscopic lens 20 may include a base 210, a plurality of lenses 220, and a marking portion 230. The plurality of lenses 220 may include first to fifth lenses 221 to 225.

The marking portion 230 may be formed on some lenses of the plurality of lenses 220 to overlap the alignment mark area MA. The marking portion 230 may include a marking line UVS disposed in a direction perpendicular to the extending direction of the plurality of lenses 220. The marking portion 230 may be formed by applying a plurality of marking lines UVS on the second lens 222. The marking portion 230 may include a plurality of marking lines UVS spaced apart from each other, and the marking portion 230 may be defined as an area between the plurality of marking lines UVS provided on at least one lens of the plurality of lenses 220. For example, the marking portion 230 may have a planar cross shape (+).

The marking portion 230 may be formed by applying a plurality of marking lines UVS having a predetermined color on some of the lenses 220. The plurality of marking lines UVS may be applied on the second, third, and fourth lenses 222, 223, and 224. In this case, the marking portion 230 may be disposed between the first and fifth lenses 221 and 225. For example, the distance between the plurality of marking lines UVS on the third lens 223 may be longer than the distance between the plurality of marking lines UVS on the second lens 222 or the distance between the plurality of marking lines UVS on the fourth lens 224.

Figure 18:
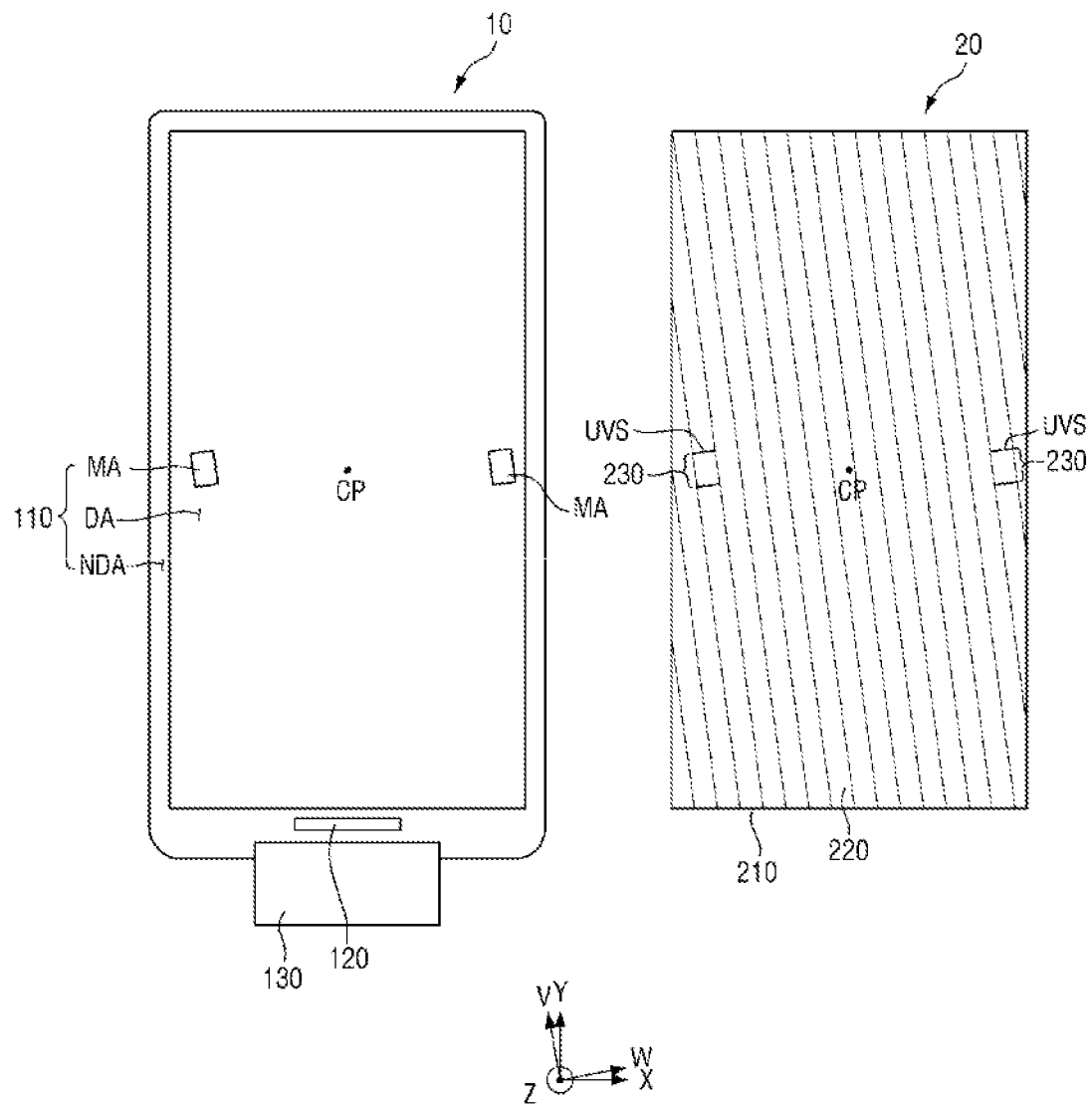
FIG. 18 is a plan view illustrating a display module and a stereoscopic lens of the display device according to another embodiment.

FIG. 18 is a plan view illustrating a display module and a stereoscopic lens of the display device according to another embodiment.

Referring to FIG. 18, the display panel 110 may include a display area DA, an alignment mark area MA, and a non-display area NDA. The plurality of alignment mark areas MA may be spaced apart from each other with respect to the center point CP of the display panel 110. For example, the plurality of alignment mark areas MA may be symmetrical with respect to the center point CP, but the present invention is not limited thereto.

The plurality of alignment marks MA may correspond to the plurality of marking portions 230, respectively. For example, the display panel 110 may include first and second alignment mark areas MA, and the first and second alignment mark areas MA may be disposed on a line extending in the first direction (X-axis direction) via the center point CP.

The stereoscopic lens 20 may include a base 210, a plurality of lenses 220, and a plurality of marking portions 230. Each of the plurality of marking portions 230 may have a flat surface surrounded by the plurality of lenses 220. The plurality of marking portions 230 may be symmetrical with respect to the center point CP of the stereoscopic lens 20. For example, the plurality of marking portions 230 may be symmetrical with respect to the center point CP, but the present invention is not limited thereto. The plurality of marking portions 230 may correspond to the plurality of alignment mark areas MA, respectively. For example, the stereoscopic lens 20 may include first and second marking portions 230, and the first and second marking portions 230 may be disposed on a line extending in the first direction (for example, the X-axis direction) via the center point CP.

The panel bonding apparatus 30 may improve alignment precision by respectively aligning the alignment marks AM of the first and second alignment mark areas MA of the display module 10 with the first and second marking portions 230 of the stereoscopic lens 20. The display device may reduce the size of the alignment mark AM by forming an alignment mark AM using a set of pixels in the alignment mark area MA. As the size of the alignment mark AM is reduced, the size of the marking portion 230 corresponding to the size of the alignment mark AM may be reduced As the sizes of the alignment mark AM and the marking portion 230 decrease, alignment precision may be improved. Therefore, the panel bonding system may improve alignment precision and reduce alignment time by aligning the alignment mark AM formed using the set of pixels in the display module 10 with the marking portion 230 of the stereoscopic lens 20.

For example, the panel bonding system may reduce panel bonding time and cost by omitting a separate additional adjustment process after the bonding process through alignment. As another example, the panel bonding system may maximize the alignment precision of the display module 10 and the stereoscopic lens 20 by performing an alignment process with improved precision and a separate adjustment process.

Figure 19:
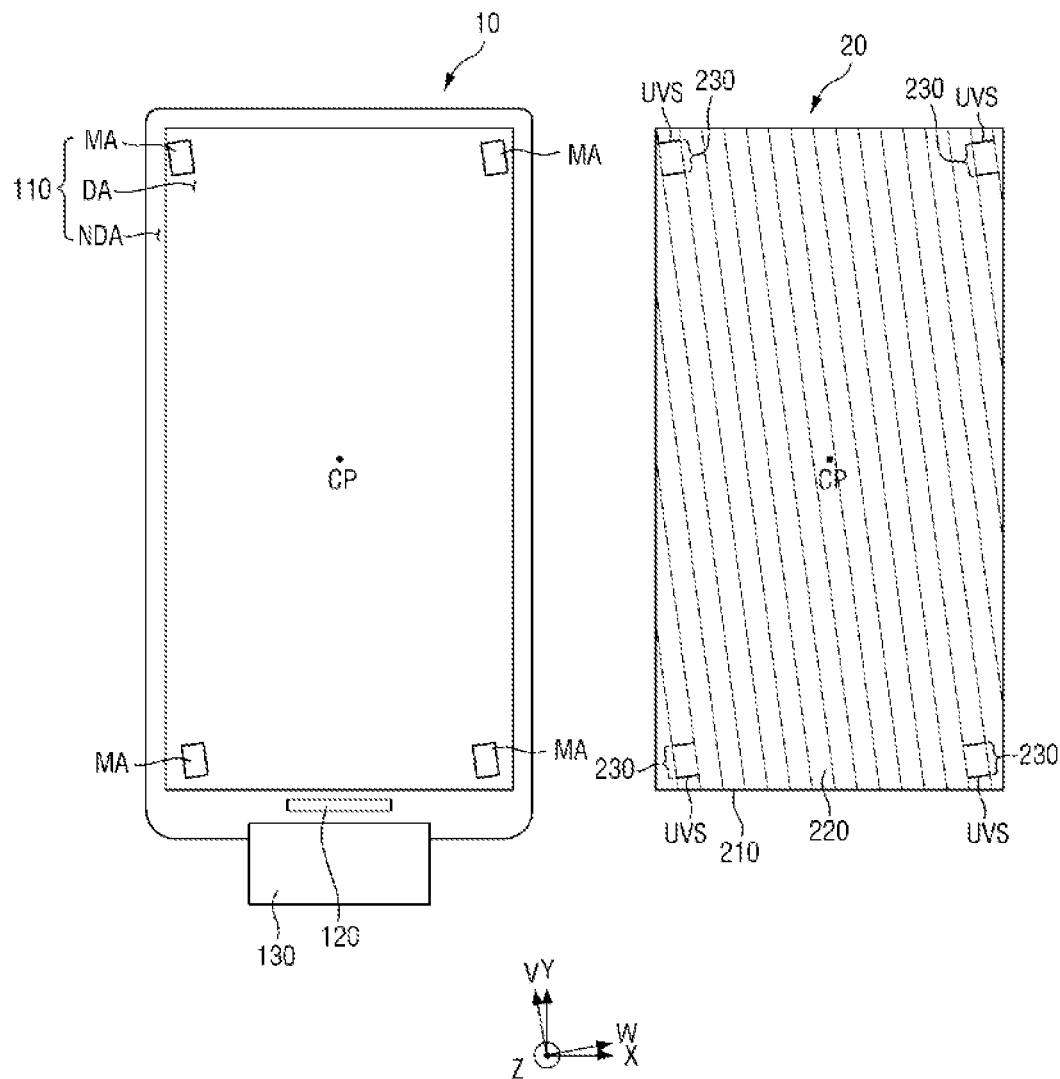
FIG. 19 is a plan view illustrating a display module and a stereoscopic lens of the display device according to another embodiment.

FIG. 19 is a plan view illustrating a display module and a stereoscopic lens of the display device according to another embodiment.

Referring to FIG. 19, the display panel 110 may include a display area DA, a plurality of alignment mark areas MA, and a non-display area NDA. The plurality of alignment mark areas MA may be adjacent to a plurality of corners of the display panel 110, respectively. For example, the plurality of alignment mark areas MA may be symmetrical with respect to the center point CP, but the present invention is not limited thereto. The plurality of alignment marks MA may correspond to the plurality of marking portions 230, respectively. For example, the display panel 110 may include first to fourth alignment mark areas MA, and the first to fourth alignment mark areas MA may be disposed at four corners of the display area DA, respectively.

The stereoscopic lens 20 may include a base 210, a plurality of lenses 220, and a plurality of marking portions 230. The plurality of marking portions 230 may overlap the plurality of alignment mark areas MA formed on some of the plurality of lenses 220. The plurality of marking portions 230 may be adjacent to a plurality of corners of the stereoscopic lens 20, respectively. For example, the plurality of marking portions 230 may be symmetrical with respect to the center point CP, but the present invention is not limited thereto. The plurality of marking portions 230 may correspond to the plurality of alignment mark areas MA, respectively. For example, the stereoscopic lens 20 may include first to fourth marking portions 230, and the first to fourth marking portions 230 may be disposed at four corners of the display area DA, respectively.

Accordingly, the panel bonding system may improve alignment precision and reduce alignment time by aligning the alignment mark AM formed using the set of pixels in the display module 10 with the marking portion 230 of the stereoscopic lens 20.

FIG. 20 is a flowchart illustrating a panel bonding process according to an embodiment.

Referring to FIG. 20, the panel bonding apparatus 30 may include a camera unit 310, an alignment calculation unit 320, and a bonding unit 330. The bonding unit 330 may include an adhesive material supply module 400, a bonding module 500, and a curing module 700.

The panel bonding system may provide a display module 10 having an alignment mark area MA and a stereoscopic lens 20 having a marking portion 230 (step S110).

The adhesive material supply module 400 may provide the adhesive member 450 on one surface of the display module 10 (step S120). The adhesive material supply module 400 may attach a release member 460 to the other surface of the adhesive member 450 opposite to one surface of the adhesive member 450 facing the adhesive surface of the display module 10. The release member 460 may help maintain the adhesive force of the other surface of the adhesive member 450 in the process of attaching one surface of the adhesive member 450 to the adhesive surface of the display module 10.

The display driver 120 may form an alignment mark AM by driving a set of pixels in the alignment mark area MA in the process of bonding the display module 10 and the stereoscopic lens 20 (step S130).

The bonding module 500 may align the alignment mark AM and the marking portion 230 to bond the stereoscopic lens 20 to one surface of the display module 10 provided with the adhesive member 450 (step S140).

The curing module 700 may cure the adhesive member 450 between the display module 10 and the stereoscopic lens 20, and may remove the marking portion (step S150). The marking line UVS may be softened by ultraviolet rays of the curing module 700. After the alignment and bonding of the display module 10 and the stereoscopic lens 20 are completed, the marking line UVS may be softened in the curing process of the adhesive member 450, and thus may have a transparent state without a separate process. Accordingly, since the marking line UVS of the display device is softened by light of a specific wavelength and rendered substantially transparent, the image quality of the display device may not be deteriorated even when the marking portion 230 is disposed on the stereoscopic lens 20.

The display device may form an alignment mark using a set of pixels in the display area DA without using an alignment mark that is disposed outside the display area DA or not related to the display image. The display device may form an alignment mark using the set of pixels in the alignment mark area MA, thereby reducing the size of the alignment mark. Accordingly, the panel bonding system can improve alignment precision by aligning the alignment mark formed using the set of pixels in the display module 10 with the marking portion 230 of the stereoscopic lens 20. The panel bonding system may reduce panel bonding time and cost by omitting a separate additional adjustment process after the bonding process through alignment.

FIG. 21 is a flowchart illustrating a panel bonding process according to another embodiment.

Referring to FIG. 21, the panel bonding apparatus 30 may include a camera unit 310, an alignment calculation unit 320, and a bonding unit 330. The bonding unit 330 may include an adhesive material supply module 400, a bonding module 500, an adjustment module 600, and a curing module 700.

The panel bonding system may provide a display module 10 having an alignment mark area MA and a stereoscopic lens 20 having a marking portion 230 (step S210).

The adhesive material supply module 400 may provide the adhesive member 450 on one surface of the display module 10 (step S220). The adhesive material supply module 400 may attach a release member 460 to the other surface of the adhesive member 450 opposite to one surface of the adhesive member 450 facing the adhesive surface of the display module 10. The release member 460 may help maintain the adhesive force of the other surface of the adhesive member 450 in the process of attaching one surface of the adhesive member 450 to the adhesive surface of the display module 10.

The display driver 120 may form an alignment mark AM by driving a set of pixels in the alignment mark area MA in the process of bonding the display module 10 and the stereoscopic lens 20 (step S230).

The bonding module 500 may align the alignment mark AM and the marking portion 230 to bond the stereoscopic lens 20 to one surface of the display module 10 provided with the adhesive member 450 (step S240).

The adjustment module 600 may finely adjust the alignment of the display module 10 and the stereoscopic lens 20 by driving the display module 10 after the alignment of the display module 10 and the stereoscopic lens 20 is adjusted by the bonding module 500 (step S250). The adjustment module 600 may finely adjust the alignment of the display module 10 and the stereoscopic lens 20 until the light output L of the display module 10 having passed through the stereoscopic lens 20 has a clear line shape as shown in FIG. 12.

The curing module 700 may cure the adhesive member 450 between the display module 10 and the stereoscopic lens 20 (step S260).

Therefore, the panel bonding system may maximize alignment precision of the display module 10 and the stereoscopic lens 20 by finally checking the light output of the display device.

According to a display device according to embodiments and a panel bonding system including the display device, a display driver may form an alignment mark by driving pixels in an alignment mark area in the process of bonding a display module and a stereoscopic lens. The display device may reduce the size of the alignment mark by forming the alignment mark using a set of pixels in the alignment mark area. Therefore, the panel bonding system can improve alignment precision and reduce alignment time by aligning the alignment mark using the set of pixels in the display module with the marking portion of the stereoscopic lens.

According to a display device according to embodiments and a panel bonding system including the display device, a marking line may have a predetermined color in the process of aligning the display module and the stereoscopic lens, and may be softened by ultraviolet rays that may cure an adhesive material between the display module and the stereoscopic lens. The marking portion may be softened in the process of bonding the display module and the stereoscopic lens, thereby having a transparent state without additional process and not deteriorating the image quality of the display device.

The effects of the present invention are not limited by the foregoing, and other various effects are anticipated herein.

Although the preferred embodiments of the present invention have been disclosed for illustrative purposes, those skilled in the art will appreciate that various modifications, additions, and substitutions are possible, without departing from the scope and spirit of the disclosure as disclosed in the accompanying claims.

What is claimed is:

1. A display device, comprising:
a display module including a display panel,
wherein the display panel includes a display area having a plurality of pixels and an alignment mark area surrounded by the display area, and a display driver driving at least one of the plurality of pixels in the alignment mark area to form an alignment mark; and
a stereoscopic lens disposed on the display module, the stereoscopic lens including a plurality of lenses arranged along an axis that an angle offset from a side of the display module, and wherein a marking portion is formed on one or more of the plurality of lenses to overlap the alignment mark area,
wherein the marking portion includes a marking line disposed in a direction perpendicular to an extending direction of the plurality of lenses, and
the marking line includes a material rendered transparent by light.

2. The display device of claim 1, wherein the marking portion is defined as an area between a plurality of marking lines provided on at least one of the plurality of lenses.

3. The display device of claim 1,
wherein one side the marking portion is parallel or perpendicular to an extending direction of the axis.

4. The display device of claim 1,
wherein the alignment mark area is disposed at a center of the display panel, and the marking portion is disposed at a center of the stereoscopic lens.

5. The display device of claim 1,
wherein the display panel includes a plurality of alignment mark areas spaced apart from each other with respect to a center point of the display panel, and the stereoscopic lens includes a plurality of marking portions spaced apart from each other with respect to a center point of the stereoscopic lens.

6. The display device of claim 1,
wherein the display panel includes a plurality of alignment mark areas adjacent to a plurality of corners of the display panel, respectively, and the stereoscopic lens includes a plurality of marking portions adjacent to a plurality of corners of the stereoscopic lens.

7. A panel bonding system, comprising:
a display module including a display panel having a plurality of pixels and a display driver driving one or more of the plurality of pixels to form an alignment mark;
a stereoscopic lens including a base disposed on the display module, the stereoscopic lens including, a plurality of lenses arranged along an axis that forms an angle offset from a side of the display module, and a marking portion formed on one or more of the plurality of lenses to overlap the alignment mark; and
a panel bonding apparatus aligning the alignment mark and the marking portion and bonding the display module and the stereoscopic lens,
wherein the marking portion includes a marking line disposed in a direction perpendicular to an extending direction of the plurality of lenses, and
the marking line includes a material rendered transparent by ultraviolet light.

8. The panel bonding system of claim 7,
wherein the marking portion is defined as an area between a plurality of marking lines provided on at least one of the plurality of lenses.

9. The panel bonding system of claim 7,
wherein one side of the marking portion is parallel or perpendicular to an extending direction of the plurality of lenses.

10. The panel bonding system of claim 7,
wherein the display panel comprises:
a display area including the plurality of pixels; and
an alignment mark area surrounded by the display area and including a set of pixels forming the alignment mark.

11. The panel bonding system of claim 10,
wherein the alignment mark is formed by driving pixels arranged in a predetermined row and pixels arranged in a predetermined column intersecting the predetermined row among the set of pixels in the alignment mark area.

12. The panel bonding system of claim 10,
wherein the plurality of pixels includes a plurality of unit pixels each including first to third sub-pixels, and
the alignment mark is formed by lighting unit pixels arranged in a predetermined row and unit pixels arranged in a predetermined column intersecting the predetermined row among the set of pixels in the alignment mark area.

13. The panel bonding system of claim 10,
wherein the plurality of pixels includes a plurality of first to third sub-pixels, and
the alignment mark is formed by lighting first sub-pixels arranged in a predetermined row and first sub-pixels arranged in a predetermined column intersecting the predetermined row among the set of pixels in the alignment mark area.

14. The panel bonding system of claim 7, wherein the panel bonding apparatus comprises:
A camera unit configured to photograph alignment of the alignment mark and the marking portion to generate image data;
An alignment calculation unit calculating a horizontal distance and vertical distance for alignment adjustment based on the image data to generate alignment data; and
A bonding unit bonding the display module and the stereoscopic lens based on the alignment data.

15. The panel bonding system of claim 14,
wherein the bonding unit comprises:
an adhesive member supply module providing an adhesive member between the display module and the stereoscopic lens;
a bonding module configured to attach the display module and the stereoscopic lens with the adhesive member and adjusting the alignment of the display module and the stereoscopic lens based on the alignment data; and
a curing module configured to irradiate the adhesive member.

16. The panel bonding system of claim 15,
wherein the curing module softens the marking line by, irradiating the marking line with light.

17. The panel bonding system of claim 15,
wherein the bonding unit further comprises:
an adjustment module configured to drive the display module after the alignment of the display module and the stereoscopic lens is adjusted by the bonding module, and to finely adjust the alignment of the display module and the stereoscopic lens.

18. The panel bonding system of claim 17,
wherein the adjustment module performs the fine adjustment based on degree of clearness of light emitted from the display module, wherein the light is passed through the stereoscopic lens.

19. A method of manufacturing a display device, comprising:
forming an alignment mark by driving a set of pixels in an alignment mark area of a display panel;
forming a marking portion on a stereoscopic lens, wherein the stereoscopic lens comprises a plurality of lenses arranged along an axis that forms at an angle offset from a side of the display panel;
aligning the display panel and the stereoscopic lens using the alignment mark and the marking portion; and
bonding the display pane to the stereoscopic lens.

* * * * *